United States Patent [19]

Venkataraman

[11] Patent Number: 5,802,052
[45] Date of Patent: Sep. 1, 1998

[54] SCALABLE HIGH PERFORMANCE SWITCH ELEMENT FOR A SHARED MEMORY PACKET OR ATM CELL SWITCH FABRIC

[75] Inventor: Krishnan Venkataraman, Folsom, Calif.

[73] Assignee: Level One Communication, Inc., Sacramento, Calif.

[21] Appl. No.: 673,236

[22] Filed: Jun. 26, 1996

[51] Int. Cl.[6] .................................................. H04L 12/56
[52] U.S. Cl. .................................................. 370/395
[58] Field of Search ................................ 370/375, 376, 370/388, 389, 390, 395, 396, 353, 354, 355, 428, 397, 399, 362, 412, 230.05

[56] References Cited

U.S. PATENT DOCUMENTS

| | | | |
|---|---|---|---|
| 4,949,338 | 8/1990 | Albal et al. | 370/462 |
| 5,500,851 | 3/1996 | Kozaki et al. | 370/395 |
| 5,546,392 | 8/1996 | Boal et al. | 370/438 |
| 5,557,621 | 9/1996 | Nakano et al. | 370/395 |
| 5,619,510 | 4/1997 | Kurano | 370/395 |

OTHER PUBLICATIONS

Chemarin, A. et al., "A High–Speed CMOS Circuit for 1.2Gb/s 16×16 ATM Swtiching", IEEE Journal of Solid–State Circuits, Jul. 1992, vol. 27, No. 7, pp. 1116–1120.

Denzel, W.E. et al., "A Flexible Shared–Buffer Switch for ATM at Gb/s Rates", Computer Networks and ISDN Systems, Jan. 1995, vol. 27, No. 4, pp. 611–623.

Collivignarelli, M. et al., "A Complete Set of VLSI Circuits for ATM Switching", IEEE, 1994, pp. 134–138.

Saito, H. et al., "Multicast Function and its LSI Implementation in a Shared Multibuffer ATM Switch", IEEE, 1994, pp. 315–322.

A copy of the International Search Report for counterpart PCT Application No. PCT/US97/04140.

Takahiko Kozaki, Noboru Endo, Yoshito Sakurai, Osamu Matsubara, Masao Mizukami and Ken'ichi Asano, "32×32 Shared Buffer Type ATM Switch VLSI for B–ISDN's", IEEE Journal on Selected Areas in Communications, vol. 9, No. 8, Oct. 1991, 1239–1247.

Yasuro Shobatake, Masahiko Motoyama, Emiko Shobatake, Takashi Kamitake, Shoichi Shimizu, Makoto Noda and Kenji Sakaue, "A one–chip Scalable 8* 8 ATM Switch LSI Employing Shared Buffer Architecture", IEEE Journal on Selected Areas in Communications, vol. 9, No. 8, Oct. 1991, 1248–1254.

Noboru Endo, Takahiko Kozaki, Toshiya Ohuchi, Hiroshi Kuwahara and Shinobu Gohara, "Shared Buffer Memory Switch for an ATM Exhange", IEEE Transactions on Communications, vol. 41, No. 1, Jan. 1993, 237–245.

(List continued on next page.)

*Primary Examiner*—Chau Nguyen
*Attorney, Agent, or Firm*—Merchant, Gould, Smith, Edell, Welter & Schmidt, P.A.

[57] ABSTRACT

A scalable high performance ATM cell/packet switch (HiPAS) element for a shared memory switch fabric application. The switch element includes a PAC Bus (Packet/ATM Cell Bus) and the Switch Fabric Controller bus (SC Bus). The HiPAS switch element receives and transmits the ATM cells/packets through the PAC Bus. The PAC bus provides independent parallel datapaths for the receive port and transmit port. The PAC Bus provides a unique structural feature to the HiPAS switch element and allows expansion to the switch capacity in a manner similar to a bit-slice processor. Multiple number of HiPAS switch elements can be concatenated to expand the capacity. In the concatenated configuration, the datapaths of the receive port and transmit port are interleaved so that the interconnection remains point-to-point. As the result, all of the switch ports in the switch execute the cell transactions concurrently on the PAC bus. In addition, each switch fabric port has a dedicated serial ports to exchange status information between the switch fabric and the switch port adapter.

81 Claims, 26 Drawing Sheets

OTHER PUBLICATIONS

H. Yamanaka, H. Saito, H. Yamada, M. Tsuzuki, S. Kohama, H. Ueda, H. Kondoh, Y. Matsuda and K. Oshima, "622 Mb/s 8×8 Shared Multibuffer ATM Switch with Hierarchical Queueing and Multicast Functions", IEEE Globocom Telecommunications Conference, 1993, 1488–1495.

Sanjeev Kumar and Dharma P. Agrawal, "A Shared Buffer Direct–Access (SBDA) Switch Architecture for ATM–based Networks", SUPERCOMM/ICC'94, 101–105.

| HiPAS/PAC Bus data interleaving | Number of HiPAS Devices in the fabric | Switch System Configuration | |
|---|---|---|---|
| | | 622 Mbps Ports | Capacity |
| 16-bit (none) | 1 | 1 | 1.6 Gbps |
| 8-bit | 2 | 2 | 3.2 Gbps |
| 4-bit | 4 | 4 | 6.4 Gbps |
| 2-bit | 8 | 8 | 12.8 Gbps |
| 1-bit | 16 | 16 | 25.6 Gbps |

| Signal | Direction | Description |
|---|---|---|
| SPSYNC | Input | Switch fabric synchronization signal. |
| Pclk | Input | PAC bus clock |
| PRxData | Input | 16-bit Cell data word – Rx port |
| PTxData | Output | 16-bit Cell data word – Tx port |
| SSTAT | Output | Switch Fabric Congestion Status bit |
| PSTAT | Input | Port device buffer status bit |

1300

1301 1302 1304

| Word# | Hi-Byte: Bit-15 to Bit-8 | Lo-Byte: Bit-7 to Bit-0 | |
|---|---|---|---|
| 1 | RIByte-1    1310 | RIByte-2    1312 | |
| 2 | RIByte-3    1314 | RIByte-3    1316 | |
| 3 | MSByte-1    1320 | MSByte-2    1322 | |
| 4 | MSByte-3    1324 | MSByte-4    1326 | |
| 5 | CCbyte-1 | CCbyte-2 | ─1330 |
| 6 | Header-1 | Header-2 | |
| 7 | Header-3 | Header-4 | |
| 8 | UDF1 (HEC) | UDF2 | ─1340 |
| 9 | Payload 1 | Payload 2 | |
| 10 | Payload 3 | Payload 3 | |
| . | ......... | ......... | |
| . | ......... | ......... | |
| . | ......... | ......... | |
| 32 | Payload 47 | Payload 48 | |

FIG. 13

| Symbol | Type | Description |
|---|---|---|
| SBCLK | Input | SC Bus Clock |
| SCSYNC | Input | Switch fabric (local-stage) control synchronization signal |
| SECSEL | Input | Device configuration select control signal |
| SESPD(15:0) | Input | 16-bit Switch fabric select/cell buffer pointer data During HiPAS device configuration, the device select is asserted in a fully decoded format. Pre-assigned bit/device, up to 16 HiPAS devices |
| SFCMD(1:0) | Input | 2-bit command code asserted by the switch fabric controller.<br>00 – Format control cycle<br>01 – Receive cell buffer pointer/status low byte data cycle<br>10 – Transmit cell buffer pointer/status high byte data cycle<br>11 – Device configuration mode |
| SFREFA(5:0) | Input | 6-bit Reference address, during normal mode, these bits specify the cell reference number. During configuration cycle, these bits select the device control/status register and the high-order bit specifies the read/write access for the configuration cycles. |
| SECD(7:0) | Input/ Output | 8-bit Switch element HiPAS management and control data. Under normal mode of operation, it is always input and bi-directional during HiPAS configuration mode. |
| RIDO | Output | 1-bit Cell Routing Information access serial port |
| CLREFO | Output | 1-bit Cell Reference Information access serial port. |

| Configuration | Number of PGs | Read/write access |
|---|---|---|
| 1 HiPAS | 1 | 15 read, 1 idle, 15 read, 3 idle |
|  | 4 | 4 reads/PG, 1 idle, 4 writes/PG, 1 idle |
| 2 HiPAS | 2 | 8 reads/PG, 1 idle, 8 writes/PG, 1 idle |
|  | 8 | 2 reads/PG, 1 idle, 2 writes/PG, 1 idle |
|  | 4 | 4 reads/PG, 1 idle, 4 writes/PG, 1 idle |
| 4 HiPAS | 16 | 1 read/PG, 1 idle, 1 write/PG, 1 idle |
| where PG = port group. Similarly for 8 and 16 configurations |||

| Interface Reference 3606 | Request Sequence Phase-1 | | | Request Sequence Phase-2 | | |
|---|---|---|---|---|---|---|
| | Idle 16b | Cycles 4b | Service Function | Idle 16b | Cycles 4b | Service Function |
| CSBMRX | 4 | 16 | 16 cycles max. | 1 | 1 | 16 cycles max. |
| CSBMXFR 3608 | 1 | 1 | Free Rx buffer Request | 1 | 1 | Rx buffer ready request |
| | | | Transfer Rx buffer to CBRAM request, | | | Rx buffer free request |
| CSBMTX | 4 | 16 | Tx buffer request | 1 | 1 | Tx buffer free request |
| CSBMXFR | 1 | 1 | Transfer CBRAM to Tx buffer request, | 1 | — | Tx buffer ready request |

FIG. 36

SCALABLE HIGH PERFORMANCE SWITCH ELEMENT FOR A SHARED MEMORY PACKET OR ATM CELL SWITCH FABRIC

BACKGROUND OF THE INVENTION

1. Field of the Invention

This invention relates in general to a scalable high performance ATM cell/packet switch, and more particularly, to a shared memory packet or ATM cell switch wherein multiple switch fabric elements may be concatenated to expand the capacity and the datapaths of the receive port and transmit port may be interleaved so that the interconnection remains point-to-point.

2. Description of Related Art

ATM stands for "Asynchronous Transfer Model". ATM has been chosen as a transport technology for the B-ISDN (Broadband Integrated Services Digital Network) protocol stack. The ATM technology is cell based and ATM networks are connection oriented. In addition, the connections are virtual and the connection identifiers do not have a global significance when compared to other networking technologies such as ethernet, token-ring, etc.

FIG. 1 illustrates an ATM cell 10 having a 5-byte cell header 20, which identifies the connection and a 48 byte payload data 30 associated with the connection. The ATM cell 10 is essentially a short fixed-size packet, and hence, the ATM cells can be efficiently switched with a self-routing switch.

The ATM switch architecture plays a significant role in any ATM network (LAN or WAN, public or private, etc.), because each switch port provides a dedicated connection to an end-station and each port carries many number of virtual connections.

The ATM switch can be classified based on the multiplexing scheme or buffering scheme. Based on multiplexing scheme, an ATM switch can be classified as a space-division or a time-division switch. Based on buffering scheme, switch can be classified as input buffer switch, output buffer switch and shared buffer switch.

FIG. 2 illustrates a switch system 100 functionally partitioned into switch fabric sub-system 102, Switch-port ATM or packet protocol layer processing sub-system 104 and Switch-port Physical layer interface sub-system 106.

The inherent features of the shared memory switch offer several advantages when compared the other switch architectures. The most significant features of the shared memory switch include inherent non-blocking characteristics, simple implementation of priority control for different service classes and of multicasting and broadcasting.

FIG. 3 illustrates a shared memory system 300 having typical shared memory switch 302 and a common memory bus. All of the switch ports share 306 the bandwidth of the shared memory bus 304. The shared memory switch controls access to the memory 308 and services the ports 306. The switch capacity is limited by the common memory bus bandwidth. In order expand the switch system 300 capacity, the switch 302 must be redesigned with a wider datapath for the shared memory bus 304 or to operate the memory bus 304 at a higher clock speed, that is using higher speed memory.

Therefore, the traditional shared memory switch design approach is difficult to scale. In addition, the shared memory switch 302 must perform the memory management functions. As the capacity of the switch system 300 increases, the performance of the memory management must be scaled appropriately.

It can be seen then that there is a need for a shared memory switch element (HiPAS) that overcomes critical limitations of a typical shared memory switch.

It can also be seen that there is a need for a shared memory switch element which is easily scaled to provide greater bandwidth.

SUMMARY OF THE INVENTION

To overcome the limitations in the prior art described above, and to overcome other limitations that will become apparent upon reading and understanding the present specification, the present invention discloses a scalable shared memory switch element.

The present invention solves the above described problems by providing a HiPAS switch element that can be used to construct a shared memory switch fabric. The switch port on the switch fabric provides the PAC bus, through which cells/packets are transferred to and from the appropriate switch port layer processing device.

A system in accordance with the principles of the present invention includes a scalable, shared memory switch, comprising at least one HiPAS element providing access to memory and performing input and output processing of data segments on a packet/ATM cell (PAC) bus, the HiPAS element further comprising a parallel data path concatenable to provide a scalable bandwidth to the PAC bus. At least one buffer memory device is coupled to the HiPAS elements, for storing packets and cells from the switch elements. A switch fabric controller (SCON) is coupled to the HiPAS element through a switch fabric controller bus (SC bus) interface for providing control signals to the HiPAS element. All of the HiPAS switch elements in the switch fabric process cell or packet input simultaneously and all of the switching elements in the switch fabric receive cell or packet data from all of the port-group layer processing devices that are coupled to the switch elements. The HiPAS switch elements and the port-group layer processing devices are coupled by a bus (PAC bus) interconnection, the bus interconnection interleaving the data between the switch elements and the port devices. A PAC bus protocol preserves the data integrity and switching on the interleaved PAC bus data structure. A SC bus protocol is used to transfer the routing information to the switch fabric controller which manages the switching function in the switch fabric. A Layer-ATM cell processing (LAP) device identifies the connection, pre-pends the routing information, pre-pends PAC bus protocol information and transfers the information on the PAC bus. Further, a LAN (IEEE 802 style) packet port processing (POP) processing device can operate under a first mode of operation intended for a packet switching application where the frame or packet data is transferred in segments (termed as packet segments) through the PAC bus with the packet segments carrying PAC bus protocol information and the first packet segment carries an additional information for routing, and a second mode of operation intended for LAN-ATM bridge application where the packet is segmented, converted to ATM cells and transported on the PAC bus with routing information and bus protocol information. Yet, a Telcom link (T1/E1 or T3/E3) port processing (TEAM) device may perform Frame Relay interworking functions or circuit emulation functions and transfer segmented ATM cells through the PAC bus with appropriate routing information and PAC bus protocol information.

One aspect of the present invention is that the HiPAS based switch fabric performs both ATM (fixed length) cell switching and (variable length) packet switching.

Another aspect of the present invention is that cell and packet switching is achieved by the PAC bus protocol and the switch fabric control bus (SC bus) protocol.

Another aspect of the present invention is that the PAC bus protocol allows the HiPAS element to identify the type of switching and extracts appropriate routing field information.

Another aspect of the present invention is that different switch port protocol processing devices can be used to perform cell based or packet based (or combination of both) switching in the proposed switch fabric.

Still another aspect of the present invention is that a switch fabric port interface is provided having a receive interface port and a transmit interface port with ATM cell or packet segments being transferred to the switch fabric through the receive interface port and ATM cell or packet segments being transferred from the fabric to the switch ports through the transmit interface.

Another aspect of the present invention is that a cell on the receive and transmit interfaces may be transferred synchronously using a common switch fabric cell sync control from the switch fabric controller.

Yet another aspect of the present invention is that the switch fabric port interfaces provides status bit ports, through which status information is exchanged between the switch elements and the port group devices.

Another aspect of the present invention is that all of the switch elements (HiPAS) in the switch fabric are controlled by a single fabric controller (SCON), which is coupled through a switch controller bus (SC bus).

Another aspect of the present invention is that the shared buffer memory is partitioned into memory segments and each memory segment is controlled by a switch element (HiPAS) and all of the switch elements (HiPAS) in the switch fabric are controlled by a single fabric controller, which implements the SC bus protocol that keeps the switch fabric operation to be deterministic and synchronous.

Another aspect of the present invention is the synchronization of the switch elements with reference to data transaction on the PAC bus to preserve the data integrity of the data word which are bit-sliced and stored in the memory segment.

These and various other advantages and features of novelty which characterize the invention are pointed out with particularity in the claims annexed hereto and from a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with invention.

BRIEF DESCRIPTION OF THE DRAWINGS

Referring now to the drawings in which like reference numbers represent corresponding parts throughout:

FIG. 13 illustrates the cell data structure with 16-bit words according to the present invention;

FIG. 15 illustrates SC bus interface signals according to the present invention;

FIG. 36 illustrates the pre-fixed sequence with reference to SPSYNC or SCSYNC that the service requests are initiated and processed by to prevent contention on the pointer RAM accesses according to the present invention.

DETAILED DESCRIPTION OF THE INVENTION

In the following description of the exemplary embodiments, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a shared memory switch element which is easily scaled.

Figure 1:
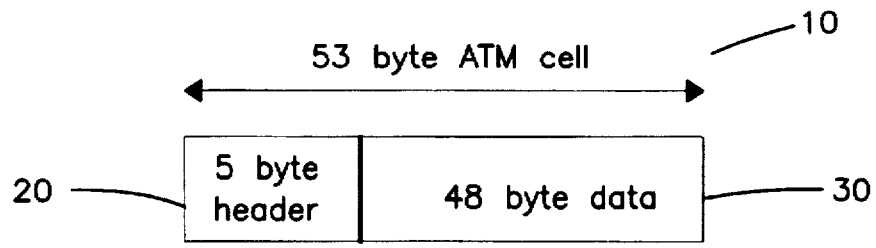
FIG. 1 illustrates an ATM cell having a 5-byte cell header which identifies the connection and a 48 byte payload data associated with the connection.
Figure 2:
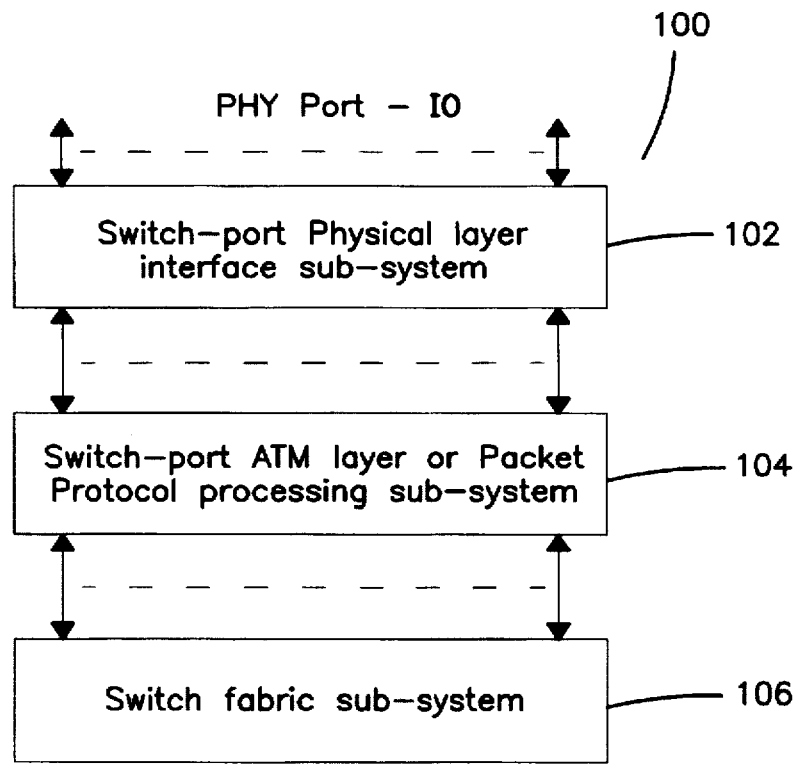
FIG. 2 illustrates a switch system functionally partitioned into switch fabric sub-system, switch-port ATM or packet protocol layer processing sub-system and the Switch-port Physical layer interface sub-system.
Figure 3:
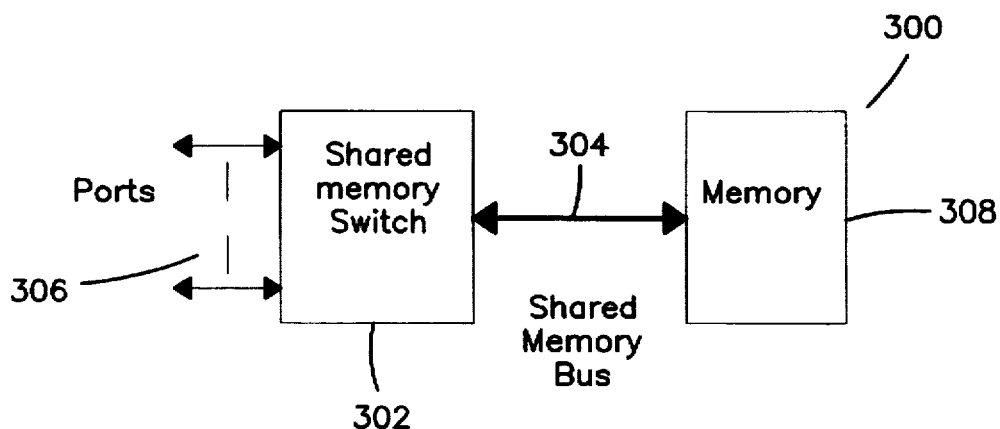
FIG. 3 illustrates a shared memory system having typical shared memory switch and a common memory bus.
Figure 4:
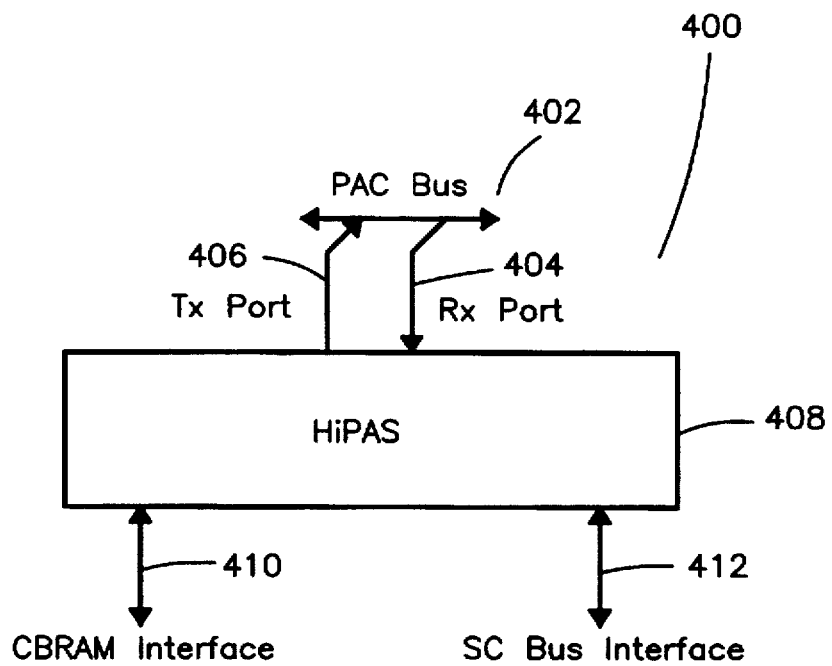
FIG. 4 illustrates an exemplary scalable, shared memory switch element according to the present invention.

FIG. 4 illustrates an exemplary system 400 according to the present invention. The Packet/ATM cell Bus (PAC Bus) 402 provides the receive 404 and transmit 406 datapath. Those skilled in the art will recognize that the bus may operate in a Packet Transfer mode of operation or ATM cell Transfer mode of operation. The PAC Bus Transaction configuration identifies the number of data cycles per bus transaction. For example, with ATM cell transactions, the number of PAC bus data cycles is 32, when the PAC bus datapath is 16-bit. Hereinafter, cell will refer to both ATM cell and packet segment. A HiPAS element 408 is coupled to the receive 404 and transmit 406 paths. The HiPAS element 408 also provides ports to the cell buffer RAM (CBRAM) 410 and to the switch fabric controller (SC bus) bus 412.

For the purpose of this discussion, a 16-bit datapath for PAC bus and a 32-bit datapath for the shared cell/packet buffer memory are considered. However, those skilled in the art will recognize that the invention is not meant to be limited by this example. A 32-bit memory datapath operating at 50 Mhz provides 1.6 Gbps capacity for a single HiPAS element and the switch port can sustain up to (16×50)800 Mbps in each direction, i.e., on the receive datapath and transmit datapath.

Figure 5:
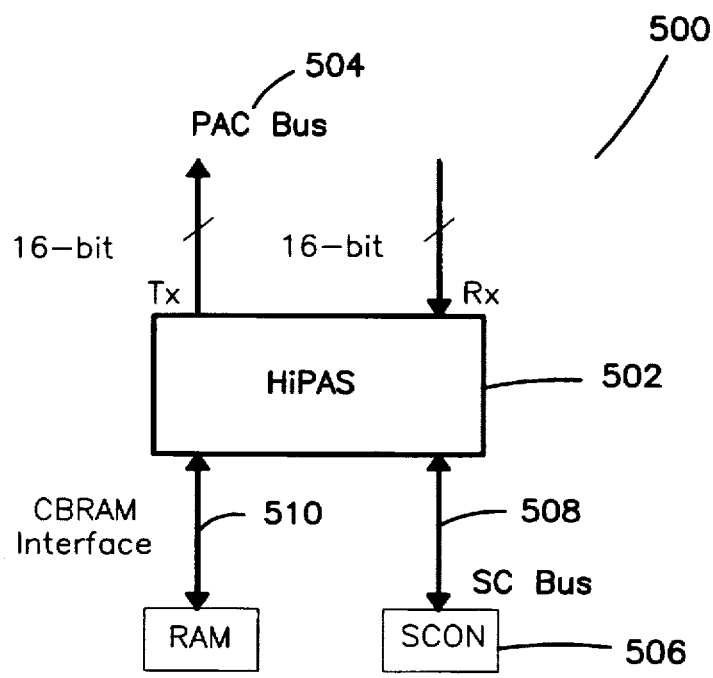
FIG. 5 illustrates a switch fabric with a single HiPAS element that uses the full 16-bit PAC bus datapath with no interleaving according to the present invention.

FIG. 5 illustrates a switch fabric 500 with a single HiPAS element 502 that uses the full 16-bit PAC bus 504 datapath with no interleaving. The switch 500 stores and forwards the complete cell information. The single HiPAS element 502 in the switch fabric 500 provides one switch port, termed as port-group, since the switch port capacity can be concentrated up to the maximum switch port capacity. For a 16-bit example, the switch port capacity is 1.6 Gbps.

The HiPAS devices 502 in the switch fabric 500 are controlled by a switch fabric controller (SCON) 506 through the switch fabric controller (SC bus) bus interface 508. The cell buffer RAM (CBRAM) interface 510 provides direct connectivity to a standard synchronous SRAM.

The switch fabric architecture uses a shared memory with a parallel datapath, which can be scaled to meet the desired switch capacity. A shared memory switch 500 with a single HiPAS element 502 provides 1.6 Gbps capacity. Similar to a bit-slice processor, multiple HiPAS devices 500 can be concatenated to expand the switch fabric capacity.

Figures 6, 7:
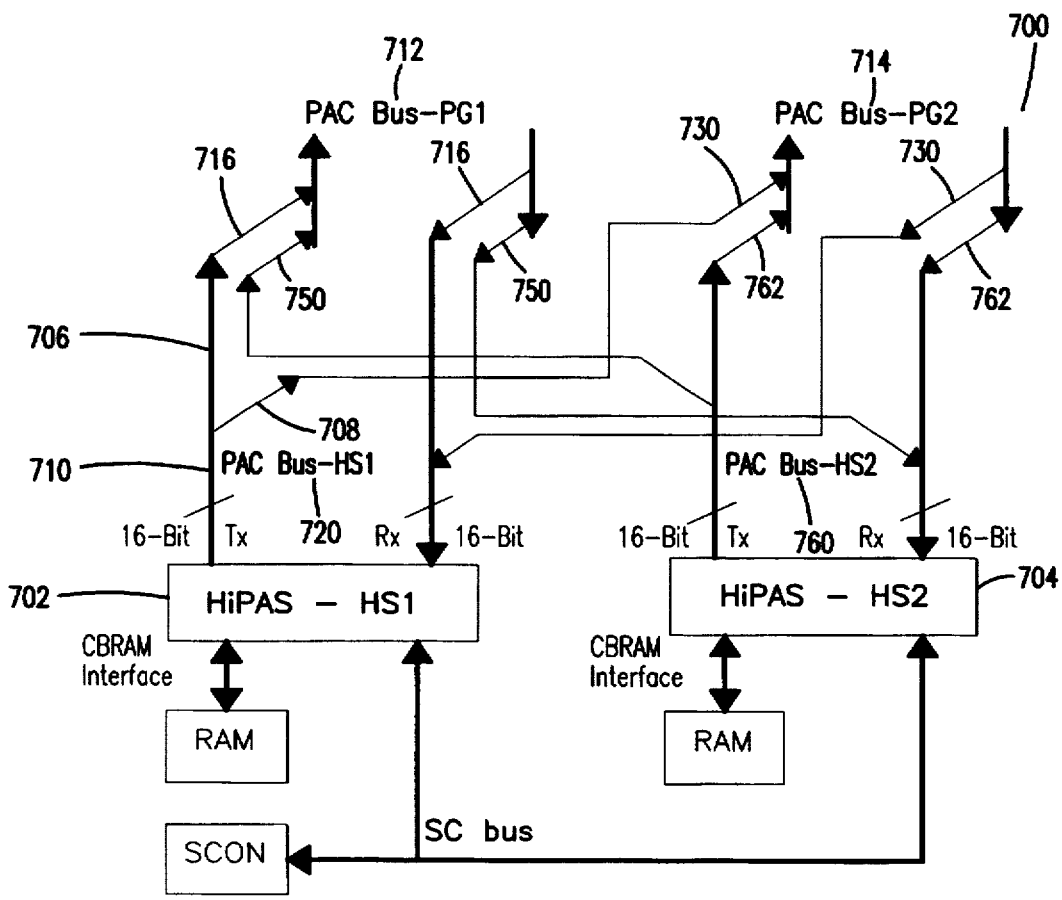
FIG. 6 illustrates a switch configuration for a PAC bus with 16-bit datapath according to the present invention.
FIG. 7 illustrates a switch fabric with two HiPAS elements which use 8-bit interleaving on the PAC bus datapath according to the present invention.

FIG. 6 illustrates the possible switch configurations 600 for a PAC bus with 16-bit datapath. In FIG. 6, the data interleaving 602 and number of switch devices in the switch fabric 604 result in a switch system having the identified number of ports 606 and capacity 608.

FIG. 7 illustrates a switch fabric 700 with two HiPAS elements 702, 704 which uses 8-bit interleaving 706, 708 on the PAC bus datapath 710. The two HiPAS elements 702, 704 in the switch fabric 700 are herein referred to as HS1 and HS2 respectively and each switch element has a dedicated switch port-group interfaces, PG1 712 and PG2 714 respectively. The PAC Bus interfaces from PG1 712 and PG2 714 are interleaved when interconnected to the HiPAS elements. The lower 8-bits 716 from PAC bus-PG1 712 are connected to the lower 8-bits of PAC bus-HS1 720. The lower 8-bits 730 from PAC bus-PG2 714 are connected to the higher 8-bits of PAC bus-HS1 720. Thus, the 16-bit datapath of PAC bus-HS1 720 is a concatenation of two 8-bit datapaths from PAC bus-PG1 712 and PAC bus-PG2 714. Similarly, the higher 8-bits 750 from PAC bus-PG1 712 are connected to the lower 8-bits of the PAC bus-HS2 760. The higher 8-bits 762 from the PAC bus-PG2 714 are connected to the higher 8-bits of the PAC bus-HS2 760. Thus the 16-bit datapath of the PAC bus-HS2 760 is a concatenation of two 8-bit datapaths from PAC bus-PG1 712 and PAC bus-PG2 714. Hence, with reference to the port-groups and PAC bus datapath, there is an 8-bit interleaving. Lower 8-bits from all of the port-group PAC buses are connected to HS1 702 and higher 8-bits are connected to HS2 704. The operations in the switch fabric elements HS1 702 and HS2 704 are synchronized. The data transactions on the PAC bus-HS1 720 and PAC bus-HS2 760 are synchronized and hence, the cell/packet data integrity is preserved.

Figure 8:
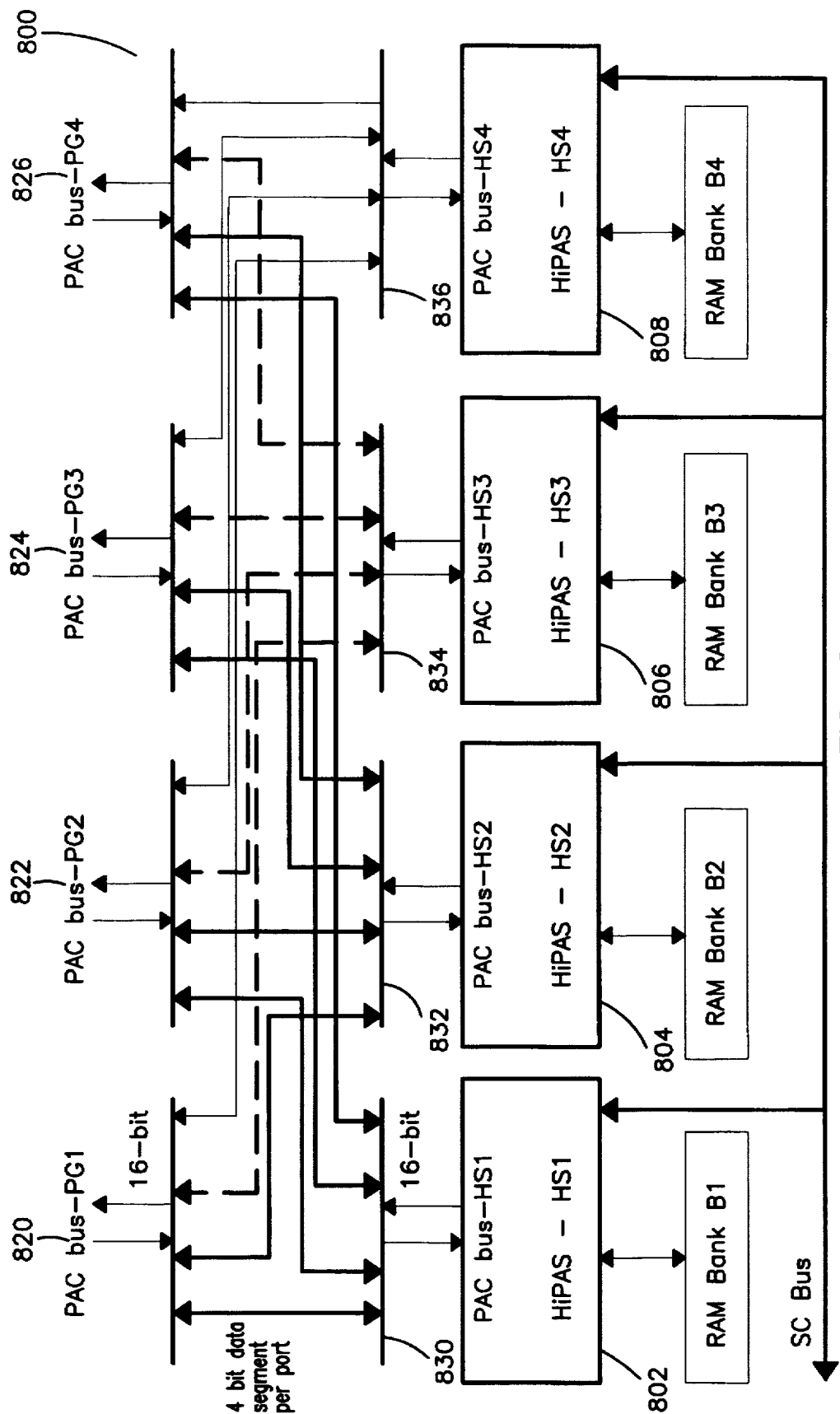
FIG. 8 illustrates a switch fabric with four HiPAS elements that use 4-bit interleaving on the PAC bus datapath according to the present invention.

FIG. 8 illustrates a switch fabric 800 with four HiPAS elements 802, 804, 806, 808. The switch fabric 800 uses 4-bit interleaving on the PAC bus datapath. The four HiPAS elements 802, 804, 806, 808 in fabric 800 are herein referred to as HS1 through HS4 respectively. Each switch element has a dedicated switch port-group interfaces, PG1 820 through PG4 826 respectively. The PAC Bus interconnections from port-groups PG1 820 through PG4 826 to the HiPAS elements 802, 804, 806, 808 are similar to the two-HiPAS case. However, in the four-HiPAS configuration lower 4-bits from all of the port-groups, PG1 820 through PG4 826 are concatenated to form the PAC bus-HS1, which is connected to the HiPAS element-HS1 802.

FIG. 8 illustrates the interconnection between the port-group PAC buses 820, 822, 824, 826 and the HiPAS PAC buses 830, 832, 834, 836 are shown bi-directional to simplify the drawing. Each bi-directional interconnection represents two 4-bit ports, one for receive direction and the other for transmit direction. The next 4-bits from all of the port-groups 820, 822, 824, 826 are concatenated to from the 16-bit PAC bus for the HiPAS-HS2 832. The next four bits are concatenated for the PAC bus on HiPAS-HS3 834. The most significant 4-bits from all of the port-groups 820, 822, 824, 826 are concatenated for the PAC bus on HiPAS-HS4 836.

The same interleaving concept is extended for configurations with eight HiPAS elements and sixteen HiPAS elements. In the case of 8-HiPAS configuration, there are 8 port-groups, PG1 through PG8 and 8-HiPAS elements, HS1 through HS8. The lower 2-bits from the PAC bus of all of the port-groups PG1 through PG8 are concatenated to form the PAC bus on the HiPAS element-HS1. Similarly, the next 2-bits are concatenated on HS2, next 2-bits concatenated on HS3, and so on. The 8-HiPAS configuration with a 16-bit PAC bus results a switch fabric with a 16.8 Gbps capacity.

In the case of 16-HiPAS configuration, there are 16 port-groups, PG1 through PG16 and 16 HiPAS elements, HS1 through HS16. The least significant bit from all of the port-groups PG1 through PG16 are concatenated on the PAC bus of the HiPAS element-HS1. Similarly, PAC buses for the other elements HS2 through HS16 are formed by concatenating the respective one-bit from the port-group PAC buses. The 16-HiPAS configuration with a 16-bit PAC bus results a switch fabric with a 25.6 Gbps capacity.

Thus, it is evident that an HiPAS switch element with a 16-bit PAC bus, allows a single stage switch fabric to extend its capacity with multiple HiPAS devices. The switch system operation is illustrated herein using the 4-HiPAS based switch fabric. However, those skilled in the art will recognize that the principle of operation is the same for all configurations.

Figure 9:
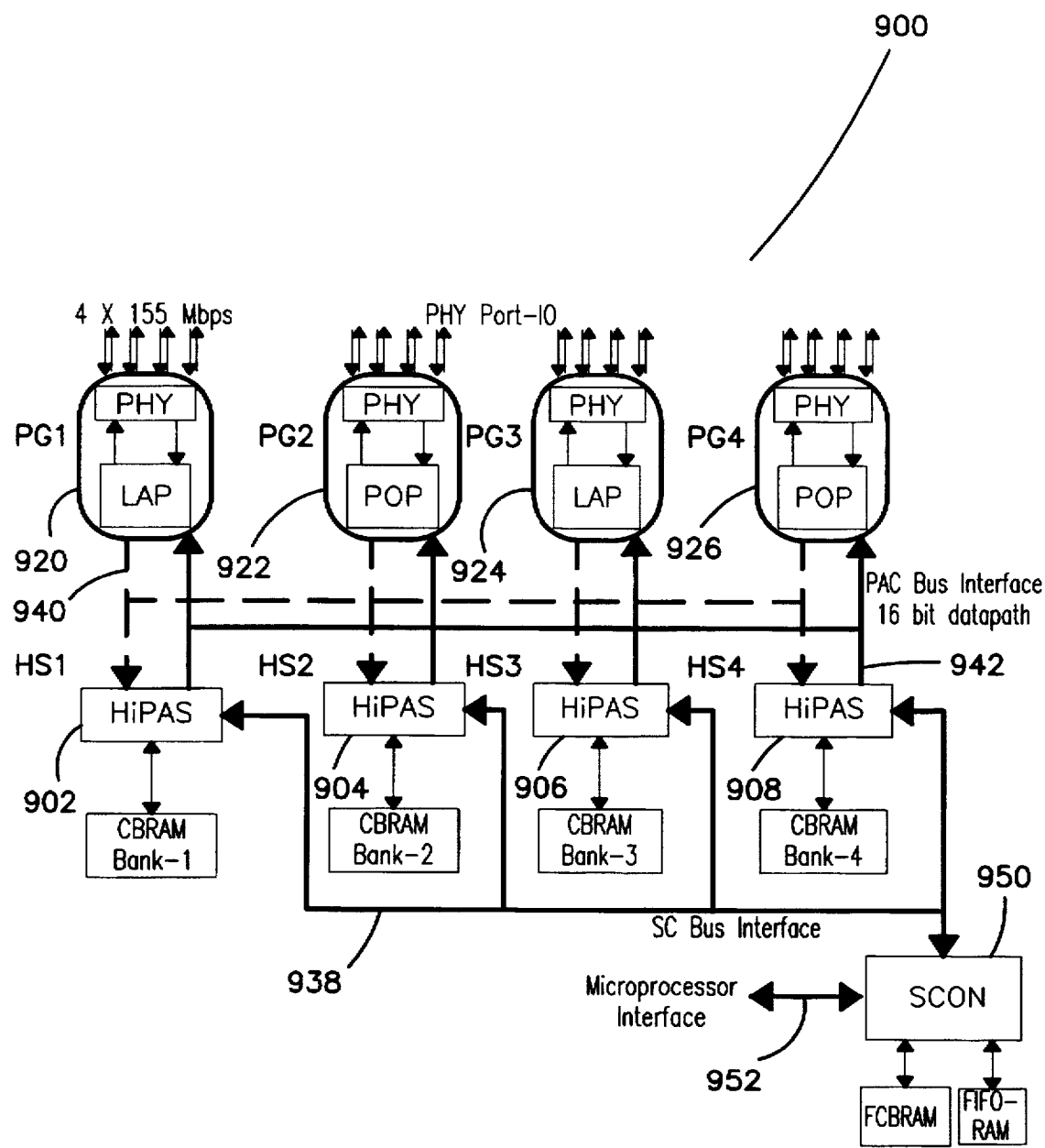
FIG. 9 illustrates a block diagram of a 4-HiPAS based switch system according to the present invention.

FIG. 9 illustrates a block diagram 900 of a 4-HiPAS based switch system. The input cell processing and output cell processing are performed concurrently in the switch fabrics 902–908.

The Cell Input processing is performed simultaneously on all of the switching elements 902–908. Each switch element receives cell data from all of the port-groups 920–926. The cell data from each port group is assembled independently and at every memory bank word length boundary, the cell data word is written into the allocated input cell buffer.

Similarly, the Cell Output processing is performed by all of the switching elements in the switch fabric 902–908. The cell data word is read independently from the allocated output cell buffer (in the shared memory) corresponding to each port group. The cell data is disassembled and simultaneously transmitted to all of the ports. The operations of all of the switching elements are controlled via the switch fabric control (SC bus) bus interface 938. A switch fabric controller (SCON) 950 for controlling the switch elements 902–908 is connected to the SC bus 938. A microprocessor interface 952 provides access to the fabric unit driver/controller. The external microprocessor can configure and initialize the switch fabric via SCON.

The PAC bus interconnections 940, 942 between the port devices and the switch fabric are interleaved in 4-bit groups. Only one HiPAS element is assigned as a primary datapath controller. The cell transaction on each port-grouping is controlled by the corresponding HiPAS element. As illustrated in the FIG. 9, the first switch element, HS1, 902 is assigned to control the transactions on Port-group-1, PG1, 920, HS2 904 for PG2 922, HS3 906 for PG3 924 and HS4 908 for PG4 926.

Figures 10, 11:
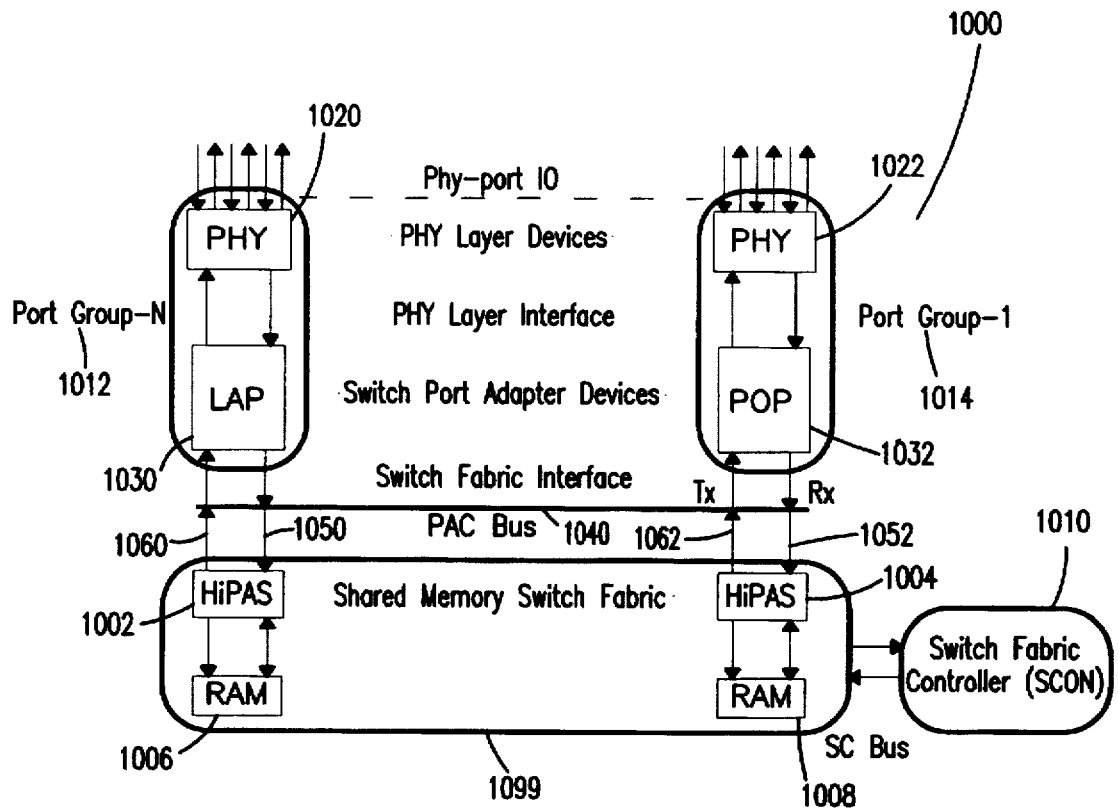
FIG. 10 illustrates the block diagram of the shared memory ATM/packet switch fabric application using the HiPAS according to the present invention.
FIG. 11 illustrates PAC bus interface signals according to the present invention.

The block diagram of the shared memory ATM/packet switch fabric application using the HiPAS 1000 is shown in FIG. 10. The switch fabric is implemented with the HiPAS elements 1002, 1004, RAMs 1006, 1008, for example standard synchronous static RAMs, and a switch fabric controller (SCON) 1010. Each HiPAS element 1002, 1004 in switch fabric provides service to a Port Group (PG) 1012, 1014. A port group can be considered as a single primary switch port or multiple Phy links/ports concentrated into a single switch ports. The main function of port groups 1012, 1014 is to provide a concentrator function, which multiplexes and demultiplexes cells from multiple ports. The concentrator functions to minimize the number of switching elements for the fabric and to maximize the switch bandwidth utilization. From the implementation point of view, the port group concentration can be provided as a single integrated solution or using multiple devices. The main functional blocks of the port group 1012, 1014 are the Physical Layer (PHY) block 1020, 1022 and the switch port adapters 1030, 1032.

The PHY block 1020, 1022 implements transport layer protocol, cell delineation function and the physical media (Fiber or copper or wireless) dependent interface. The switch port adapter block 1030, 1032 concentrates the cell/packet bandwidth and process the cells/packets to determine appropriate routing information, which is essential for the switch fabric operation. In addition, the switch port adapter block 1030, 1032 may implement other application dependent functions and protocol dependent functions. For example, if the port group is connected to a different data-link protocol (such as T1/E1, Ethernet, etc.), the switch port adapter block 1030, 1032 functions for segmentation, reassembly and virtual connection mapping. Each port group maintains a connection table, which contains a valid entry for an active connection. Each entry provides the routing information and local connection reference number. For a unicast or point-to-point connection, the routing information specifies the destination port. In addition, for the multistage switch configuration, there is a path specification for routing the cell through multiple stages. For a multipoint connection or multicast cell, a multicast group ID is used. Each switch stage controller (SCON) uses a multicast look-up table to map the destination ports. The local destination port map fetched from the look-up table active bits in the port map defines the destination ports for the cell.

The port group sends the received and connection-matched packets or cells through the Rx datapath port of the PAC Bus interface. The port group receives the switched or routed cells from the switch fabric through the Tx datapath port of the PAC Bus interface.

Each HiPAS element 1002, 1004 in the fabric 1099 provides a switch fabric port interface 1040, herein referred to as Packet/ATM Cell bus (PAC bus) interface, which contains receive (Rx) interface ports 1050, 1052 and transmit (Tx) interface ports 1060, 1062. The cells or packets are transferred to the switch fabric 1002, 1004 through the Rx interface port 1050, 1052. The cells on Rx interface port 1050, 1052 are transferred synchronously, with reference to a switch fabric sync signal. The switched cells from the fabric 1002, 1004 to the switch ports are transferred through the Tx interface 1060, 1062. The PAC Bus interface 1040 also provides status bit ports, through which the status information is exchanged between the switch fabric 1002, 1004 and the port group device 1012, 1014.

The shared memory 1006, 1008 is partitioned into memory segments or memory banks and organized like an interleaved memory, with reference to PAC bus. But, the main difference is that the interleaving is applied at the PAC bus datapath only and all the memory banks 1006, 1008 are accessed simultaneously (where as in a typical interleaved organization, only one bank can be active at any time). Each memory bank 1006, 1008 is directly interfaced to the HiPAS element 1002, 1004. The number of bits for the datapath interleaving, the number of banks 1006, 1008 and switch elements 1002, 1004 required for a switch fabric 1000 depends on the desired capacity for the targeted the switch system. Switching fabric capacity can be expanded as a single stage switch with multiple HiPAS devices or as a multistage switch using the single stage switch as building blocks.

The PAC bus Interface 1040 is a general purpose packet transfer interface. The operating modes of the PAC bus interface 1040 are fixed length ATM Cell transfer mode and variable length Packet transfer mode.

The PAC bus 1040 is a cell synchronous, point to point interconnect bus. Under the packet transfer mode, the packets are segmented into multiple transactions. Each packet segment transaction is similar to a cell transaction. The bus protocol and the buffer management are responsible for preserving the packet integrity.

The cell transactions on the receive 1050, 1052 and transmit 1060, 1062 interfaces are synchronized using a common switch fabric cell sync (SPSYNC) control from the switch fabric controller (SCON) 1010. The common SPSYNC control is used for synchronizing various operations in the switch fabric 1002, 1004 also. The table 1100 in FIG. 11 illustrates the PAC bus interface signals. As mentioned above with reference to FIG. 10, the SPSYNC signal 1102 is the switch fabric synchronization signal. The Pclk signal 1106 is the PAC bus clock 1108. The PRxData signal 1110 is a 16-bit Cell data word from the receive port 1112. The PTxData is a 16-bit cell data word 1116 that is sent out via the Transmit port.

The SSTAT 1118 and PSTAT 1122 are bit serial ports used for transferring status information between the switch fabric and the port group device Fixed serial format is used for status exchange between the port-group device and the Switch fabric device.

The PSTAT serial port 1122 provides a bit-stream data through which the switch port transmit buffer status information 1124 is reported to the switch fabric. The PSTAT data frame 1122 is received on every cell transaction slot and each data frame contains at least 36 bits. The general PSTAT frame 1122 format contains one bit even parity checksum for the serial frame data, 34-bit status information (PSTAT) and one bit type to indicate the frame data format type of the status information. Two types for PSTAT frames 1122 that may be sourced by the switch port adapter are phy-port transmit queue status frame, which is indicated by '1' in the type field and Available Bit Rate (ABR) connection feed-back status frame, indicated by '0' in the type field. The ABR connection feed-back status frames may carry the connection identifier and the routing information associated with the connection. During the cell reference tag collection operation on the SC bus, HiPAS transfers the received PSTAT information to the SCON, which decodes, processes and routes the status to other ports.

The SSTAT serial port provides a SSTAT 1118 bit-steam data through which the switch fabric FIFO status information 1120 is reported to the switch port adapter on the PAC bus. In addition, the ABR connection feed-back status from the port devices are routed to appropriate destination ports. Preferably, the minimum number of bits in the SSTAT data frame is 36 bits (based on one cell transaction). Depending on the type of SSTAT frame 1118, the complete status data transfer may take multiple frames or cell transactions. The general SSTAT frame format preferably contains one bit even parity checksum for the serial frame data, 32-bit status information (SSTAT), two bit frame ID to identify the data sequence in a multiple frame data transfers and one bit type to indicate the frame data format type of the status information. The HiPAS collects the status frame information during the switch status reporting operation on the SC bus and transfers the status data on SSTAT serial port during the PAC bus transactions cycle.

Figure 12:
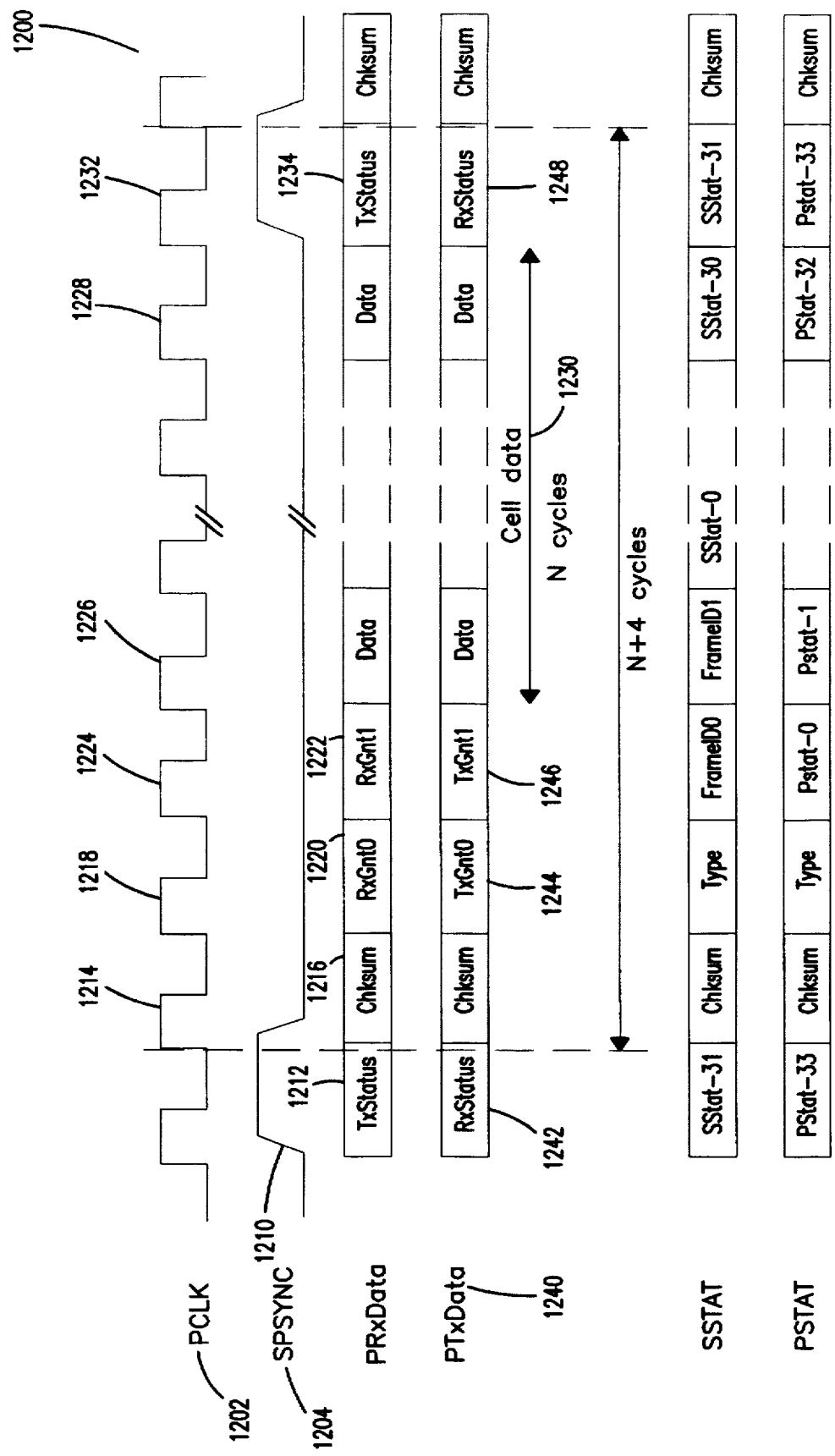
FIG. 12 illustrates the PAC bus operation and the timing according to the present invention.

The PAC bus operation and the timing 1200 is shown in FIG. 12. The PAC bus implements the standard ATM cell transfer or general purpose packet transfer mode of operation. For ATM cell switching applications the PCLK is 50 Mhz and maximum value of N 1204 is thirty-two, when PAC bus datapath is 16-bit. Each ATM cell transaction cycle is 36 clock cycles.

The SPSYNC initiates a cell transaction and the following cell structure is used on the receive interface. In a first clock cycle 1210, the SPSYNC signal 1204 becomes active and the Tx Cell buffer available status is active 1212 on all bits of the receiver port. In the next clock cycle 1214, the SPSYNC signal 1204 becomes inactive and checksum for previous cell is at the receive port 1216. In the next clock cycle 1218, the data at the receiver port is a receive cell transaction grant-0 1220, and a receive cell transaction grant-1 1222 occurs in the subsequent clock period 1224. In all subsequent clock cycles 1226 to 1228, which cell data 1230 is received. Finally, SPSYNC 1204 becomes active in the following clock cycle 1232, and the Tx cell buffer available status is indicated 1234.

The TxStatus information 1234 in the Rx port cell transaction provides the cell buffer status (of the port group device) of the TX port to the switch fabric port. This status is used as a interface level flow control for the transactions on the Tx port. Since, the PAC bus is interfaced like a configurable bit slice to the HiPAS elements, the status information on the TxStatus is essentially one-bit (1=Tx buffer available, 0=No buffer available) and it is set on all of the data bits (16 bits). A similar cell structure is used on the transmit interface 1240.

The RxStatus information 1242 in the Tx port cell 1240 transaction provides the cell status (of the switch fabric port) of the RX port to the port group device. This status 1242 may be used as a interface level flow control for the transactions on the Rx port. Since, the PAC bus may be interfaced like a configurable bit slice to the HiPAS elements, the information on the RxStatus 1242 can be essentially one-bit (1=Rx buffer available, 0=No buffer available) and may be set on all of the data bits (16 bits).

Since, the datapath is interleaved, a longitudinal parity scheme may be used to verify the datapath integrity. The bit wise even or odd (configurable) parity may be computed serially on all of the datapath bit signals. The bit-0 of the checksum word may contain the sum of bit-0 of all of the words in the transaction. Similarly, the other checksum bits may be computed. The data source or transmitter can place the computed 16-bit parity word as the checksum for the cell transaction. The receiver in the datapath may compute the parity in the same manner and verify the received parity indications.

Under the ATM cell transfer mode, the RxGnt 1220, 1222 and TxGnt 1244, 1246 are used to indicate a valid cell transaction. The RxGnt 1220, 1222 and TxGnt 1244, 1246 encoding under the ATM cell mode are preferably '0' for "No Valid Cell" and '1' for "Valid Cell Transaction."

The packet data transfer operation uses 2-bit encoding on RxGnt 1220, 1222 and TxGnt 1244, 1246 indications. For example, '0' indicates "No Packet Transfer", '1' indicates "Start of Packet", '2' indicates "Middle of Packet" and '3' indicates "End of Packet."

In addition, the RxGnt 1220, 1222 and TxGnt 1244, 1246 are used to control the flow of transactions on the bus. As in the case of RxStatus 1242, 1248 and TxStatus 1212, 1234, the Gnt indications are replicated on all of the bit positions of the data word. The Rx/TxGnt0, 1220 and 1244 respectively, specifies the least significant bit of the grant indication field and the Rx/TxGnt1, 1222 and 1246 respectively, specifies the most significant bit of the grant indication field.

The cell data structure 1300 with 16-bit words 1301 is shown in FIG. 13. The RIByte fields 1302, 1304 specify the basic cell Routing Information. For a single stage the 4 bytes of RI bytes 1310, 1312, 1314, 1316 are used to determine the destination port of the cell. For multistage switch configurations, the additional 4 bytes 1320, 1322, 1324, 1326 (MSbyte) are used to determine the cell route through an interconnection network. Two bytes (CCbyte) 1330 are reserved as a communication channel to provide internal communication between or within the switch port adapter devices. The UDF1/UDF 1340 are User defined Fields, UDF1 is reserved for header error correction and detection (HEC).

Figure 14A:
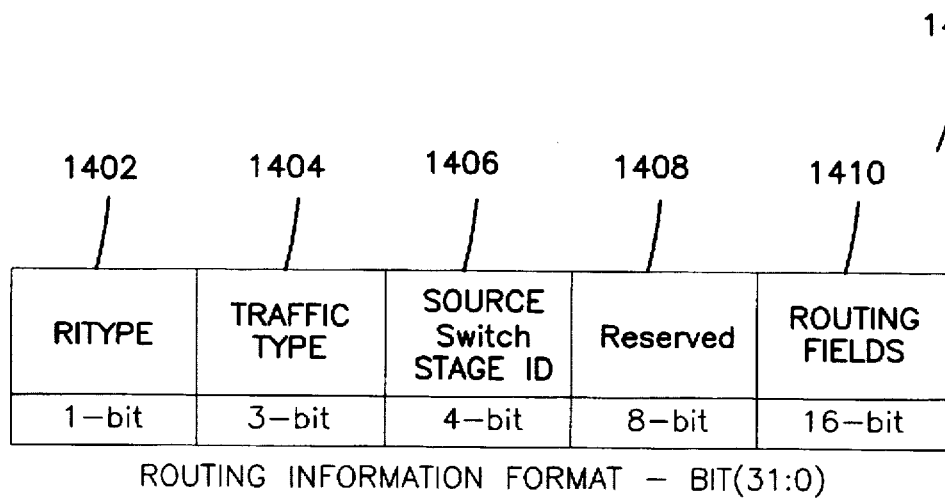
FIGS. 14a–c illustrate Routing Information that uses a 32-bit field pre-pend to the cell by the switch port adapter device according to the present invention.
Figure 14B:
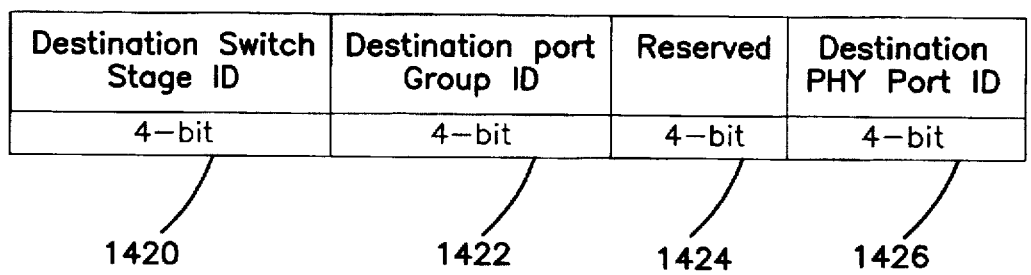
Figure 14C:
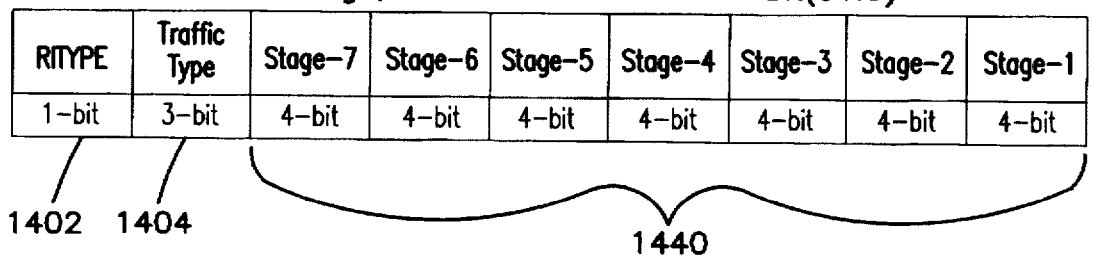

The Routing Information (RIbyte1-4) shown in FIGS. 14a–c, preferably uses a 32-bit field 1400, pre-pend to the cell by the switch port adapter (LAP or POP) block or device. The 32-bit field 1400 preferably includes one bit to identify the routing information type 1402, three bits to identify the traffic type 1404, and four bits to identify the source switch stage identification number 1406. Eight bits are marked as reserved and unused in this discussion. Finally sixteen bits are preferably provided for the routing fields. The following RI format types are used:

Unicast RI: RITYPE ='0', having a Routing Fields Format which includes four bits for destination switch stage identification number 1420, four bits for destination port group identification number 1422, four bits reserved and four bits for identifying the destination physical port 1426; and Multicast RI: RITYPE='1', having a Routing Fields Format which includes a 16-bit Multicast_Group$_{13}$ ID 1410.

The multistage routing information (MSbyte1-4) can be a 32-bit word, which includes one bit to identify the routing information type 1402, three bits to identify the traffic type 1404, and 28-bit for multistage routing information 1440. The RITYPE and Traffic type fields are used as in the case of RIbyte fields. The multistage routing information is intended for a unicast connection only and it may be organized into 7 nibble-wide fields. Hence, up to 7 stages may be supported in a multistage configuration. The nibble-wide fields provide the destination port number in the corresponding switch stage.

If the RITYPE is a Multicast RI, the MSbytes are duplicated as in the RIbytes. In any configuration, single stage or multistage, all of the multicast cells are routed using a translation table. Each multicast cell is assigned with a multicast ID and every active multicast ID has a corresponding entry in the multicast translation table. The table entry contains the destination port-group bit map. The multicast translation table is maintained and managed by the switch controller device. The multicast routing information is translated during the cell routing operation by the SCON device.

As mentioned earlier, the PAC bus operate in a Packet Transfer mode of operation or ATM Cell transfer mode of operation. The PAC Bus Transaction configuration identifies the number of data cycles per bus transaction. For ATM cell transactions, the number of PAC bus data cycles is 32.

The number of port_groups (Number-of-PGs) on the PAC bus is selected and the data-path is configured. The cell interface can be configured as 4×155 Mbps ports, where, each 155 Mbps (at 50 Mhz bus rate) port has a nibble-wide datapath interface. This means there are 4 port-groups per HiPAS element.

Alternatively, the interface can be configured as 1×622 Mbps (at 50 Mhz bus rate) port with 16-bit wide datapath. In this configuration, each HiPAS element is assigned to a port-group.

The switch fabric can be a single stage (stand-alone) switch system or a multi-stage switch system which is essentially an a network of interconnected single-stage switch blocks. In the case of a single stage switch, the cell routing operation is based on the RIbyte fields, which specifies the destination port. But in the case of multistage switch, the cell routing may have to be performed through multiple switch blocks or stages. Hence, routing information for the intermediate stages and the last stage of the switch block must be specified. The MSbyte fields is used for intermediate stages and the RIbyte fields is used by the last switch block of a multi-stage switch. The switch element (HiPAS) can be configured to operate as a single stage or multi-stage switch fabric.

The Switch fabric controller (SCON) configures and controls the HiPAS elements in the switch fabric through the SC bus interface. The basic SC bus operations are the HiPAS configuration operation, RxCell buffer pointer write operation, TxCell buffer pointer write operation, RxCell switching control data read operation, Cell buffer reference tag collection operation and switch fabric status report operation. The table 1500 in FIG. 15 illustrates the SC bus interface signals.

The SC bus is a synchronous bus with reference to a switch fabric system clock SBCLK 1502 and provides several interface signals between the HiPAS elements and the SCON. Although, complete switch system may use a common system clock, the PAC bus clock, PCLK and SC bus clock, SBCLK are considered as two different clock domains to simplify the clock distribution issues in the switch system design. The operations on the SC bus interface are synchronized with SCSYNC 1504, which is functionally equivalent to SPSYNC (on the PAC bus), but with reference to SBCLK domain. The switch fabric synchronization signals are provided by the SCON. The HiPAS is a slave on SC bus and depending on the SC bus operation, HiPAS provides appropriate responses on the bus. On SCSYNC, the response information from all of the internal blocks are latched. The responses based on the latched status information are deterministic and synchronous for the switch fabric stage.

The SESPD 1508 signal is an Input port which acts as 16-bit Sw fabric select/cell buffer pointer data. During HiPAS device configuration, the device select (SECSEL) 1506 is asserted from a pre-assigned bit-line from the SESPD. The SFCMD 1510 signal is an Input signal which acts as a 2-bit command code asserted by the switch fabric controller. The following codes are provided:

00—Transaction frame control indication cycle;
01—Receive cell buffer pointer operation cycle;
10—Transmit cell buffer pointer operation cycle; and
11—Device configuration mode cycle.

The SFREFA 1512 signal is also an Input port and it acts as a 6-bit Reference address. During normal mode, these bits specify the cell reference number. During configuration cycle, these bits select the device control/status register and the high-order bit specifies the read/write access for the configuration cycles.

The SECD 1514 is an IO port which provides 8-bit Switch element HiPAS management and control data. Under normal mode of operation, it is always input. It is bi-directional during HiPAS configuration mode. The RIDO 1516 is an Output which provides a 1-bit Cell Routing Information access Serial port. CLREFO 1518 is an Output port that acts as a 1-bit cell reference information access serial port.

Figure 16:
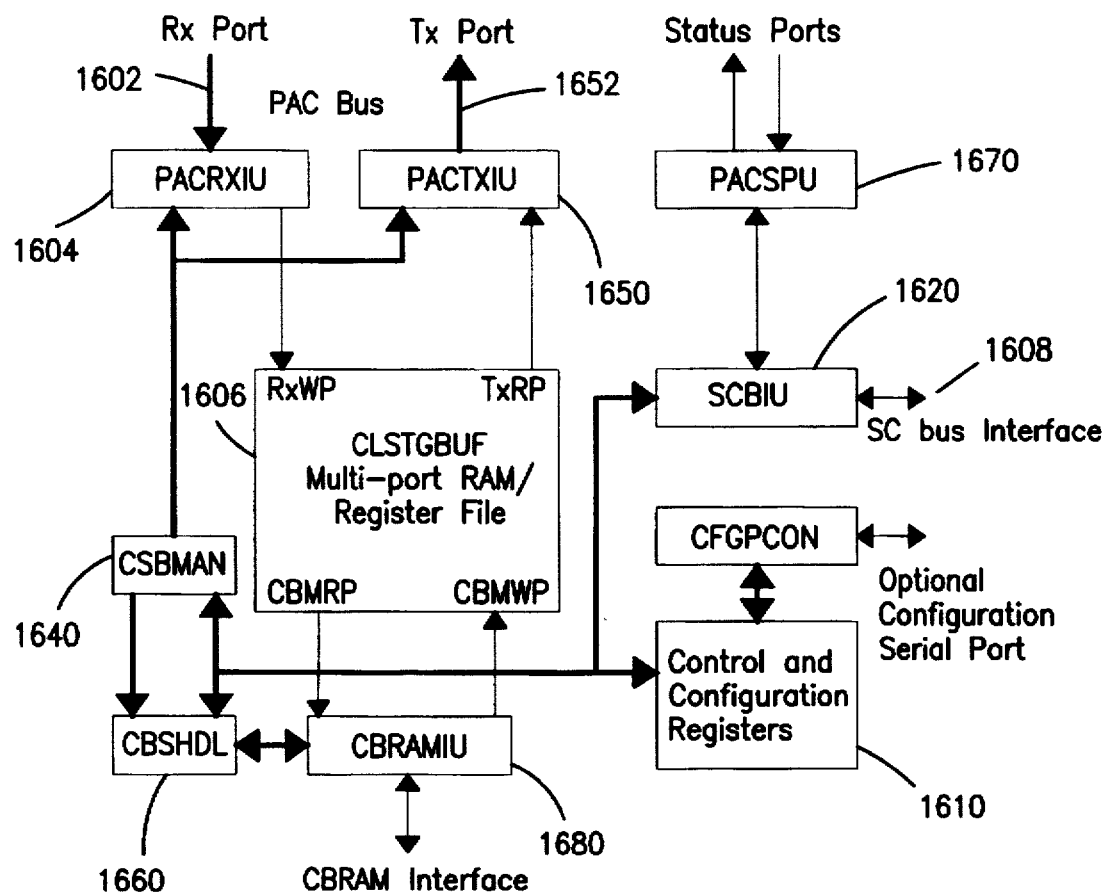
FIG. 16 illustrates the architecture of the HiPAS element according to the present invention.

The architecture of the HiPAS element 1600 is shown in FIG. 16. The cell data 1602 received from the Rx port interface 1604 are assembled and written into a common staging cell buffer 1606, which is implemented with a high-speed multi-port RAM or register file.

Figure 17:
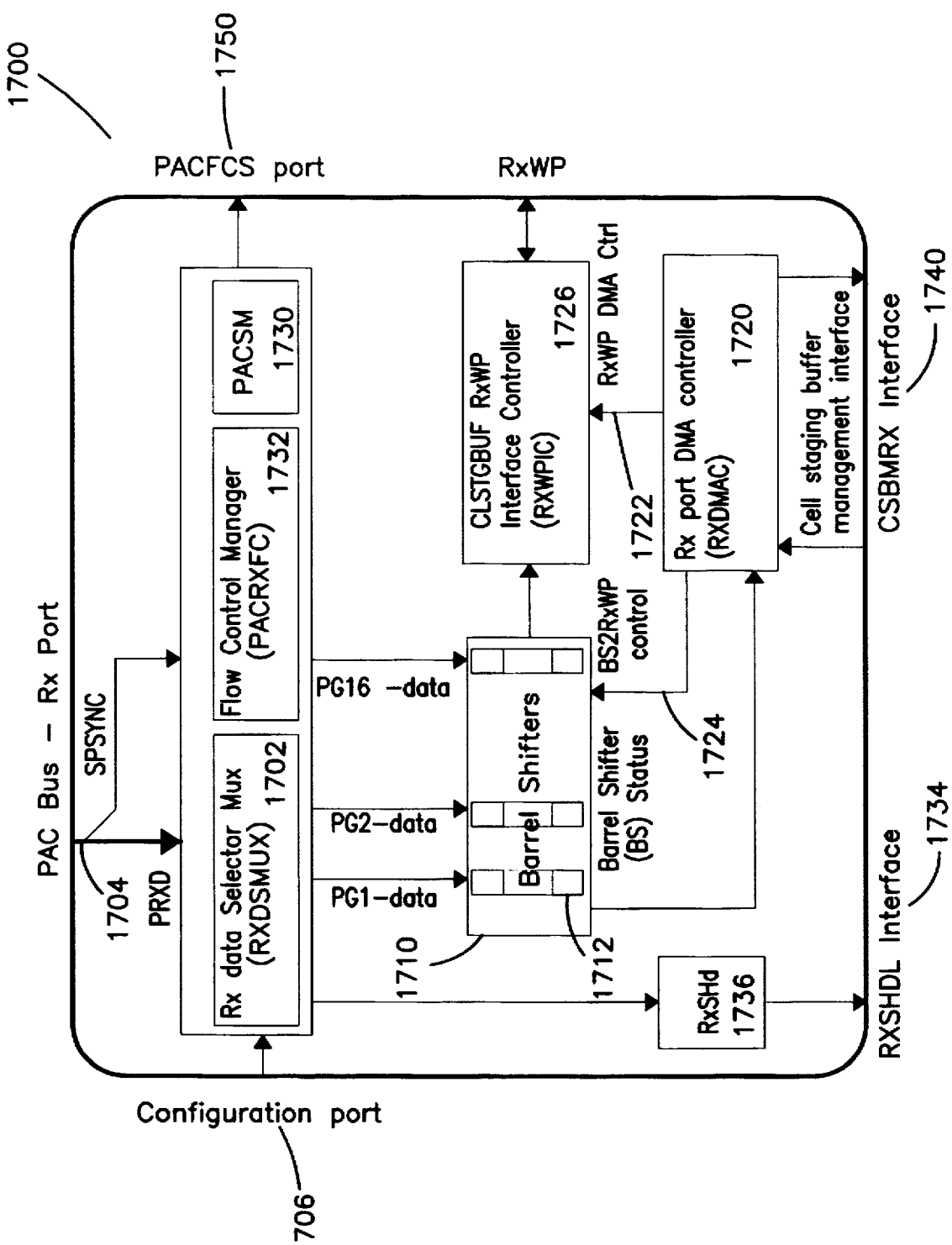
FIG. 17 illustrates a detailed block diagram of the Rx port interface function of FIG. 16 according to the present invention.

A detailed block diagram 1700 of the Rx port interface unit (PACRXIU) 1604 of FIG. 16 for the HiPAS element is shown in FIG. 17. The Rx data selector Mux (RXDSMUX) 1702 selects the interleaved data segment from the Rx datapath 1704 based on the switch configuration 1706. Now referring back to FIG. 16, during system initialization or configuration, the switch configuration data is programmed into the switch fabric HiPAS elements through the SC bus interface 1608. The switch configuration information is stored in the internal configuration and control register block 1610.

Figure 18:
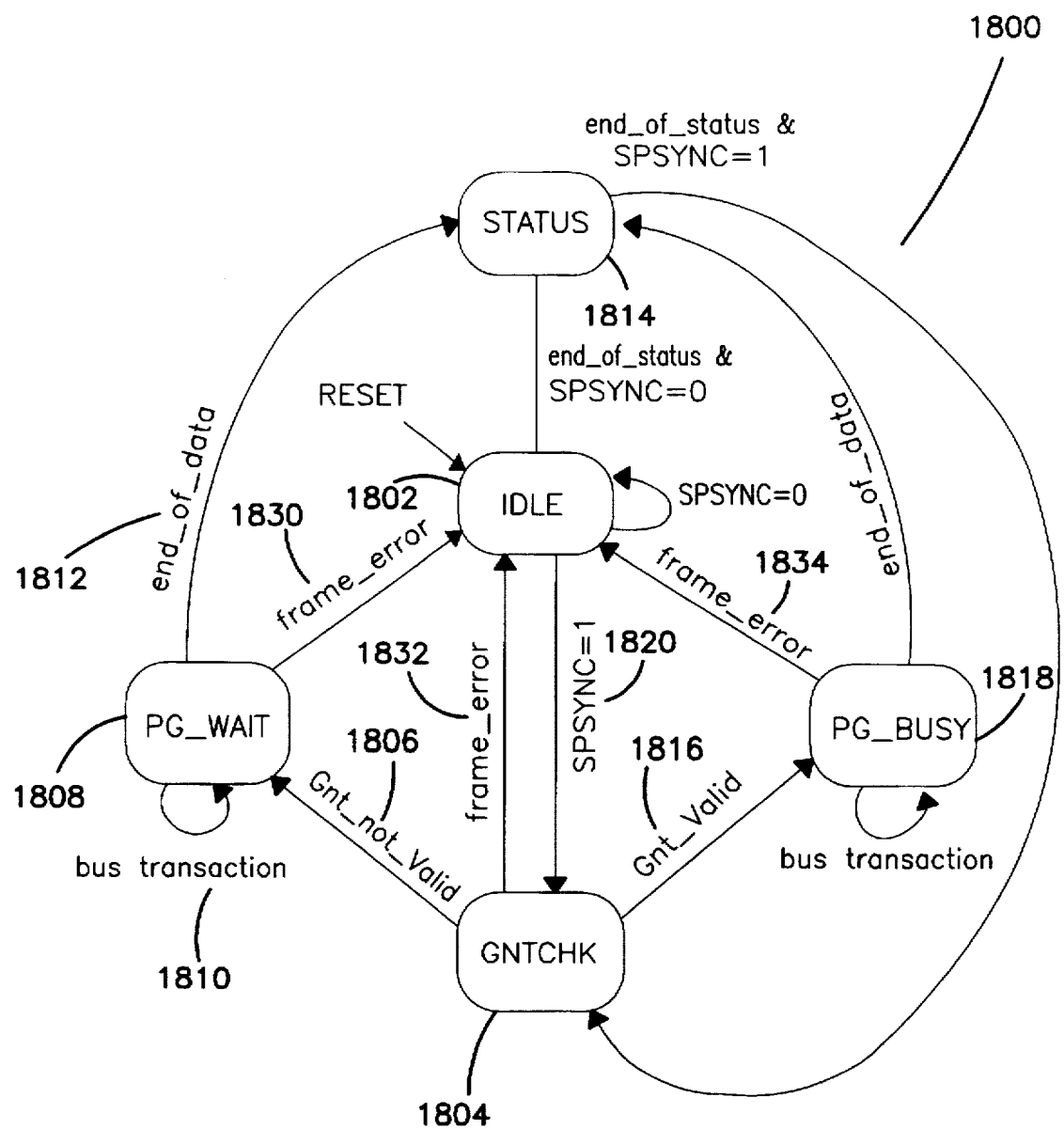
FIG. 18 is a state diagram illustrating the basic states of the PAC-SM according to the present invention.

Referring again to FIG. 17, the RXDSMUX block demultiplexes the 16-bit PAC Bus data into port-group data elements based on the Number-of-PGs and the data-path configuration (4X155 or 1X622 mode). The PAC bus state machine (PACSM) 1730 implements the PAC Bus protocol for the Rx port. The PAC bus flow control manager for the Rx-port (PACRXFC) 1732, assembles the PAC bus Rx-port status information for each port group and controls the flow of transactions on the PAC bus Rx-port. The basic states of the PACSM are shown in FIG. 18.

The initial state of the PACSM is the IDLE state 1802, which is entered on system RESET and at the end of every PAC Bus transaction on the Rx-port. The start of PAC Bus transaction is indicated by an active SPSYNC 1820 and the state machine enters the GNTCHK state 1808. The GNTCHK state is active for three bus cycles and performs the functions illustrated in below:

| GNTCHK_cycle_count or Sub-state | Functions performed |
|---|---|
| 0 | The CHKSUM word for the previous Rx-port bus transaction is latched. |
| 1 | The latched checksum is verified with the checksum register, which holds the computed checksum for the last bus transaction. The RxGNT0 word is latched into RxGNT0_register. The Checksum register is preset with the GNT0 word from the PAC bus. |
| 2 | RxGNT1 word is latched into RxGNT1_register. The grant status signals are decoded on per port-group basis and registered. |

The grant status signals that are decoded for each active port-group are illustrated below:

| RxGnt1-0 (2 bits) | Mode | Decoded signal description |
|---|---|---|
| 1 | Cell | Start of packet/cell (SOPC) is active |
| 1 | Pkt | SOPC is active, if the previous bus transaction had an active End of packet/cell (EOPC) indication. Otherwise an active RxPAC_error is registered. |
| 2 | Cell | Not applicable, assumed as SOPC. |
| 2 | Pkt | Middle of Packet/Cell (MOPC) is active, it the previous bus transaction had an active SOPC or MOPC. Otherwise, an active RxPAC_error is registered. |
| 3 | Cell | Not applicable, assumed as SOPC. |
| 3 | Pkt | End of Packet/Cell (EOPC) is active, if the previous bus transaction had an active SOPC or MOPC. Otherwise, an active RxPAC_error is registered. |
| 0 | C/P | SOPC, EOPC, MOPC are inactive. |

Under GNTCHK state, Gnt_not_valid condition 1806 is generated, if (SOPC, EOPC and MOPC) are inactive. The Gnt_not_valid condition 1806 results in PG_WAIT state for the corresponding port_group. At the end of the configured number of PAC bus data cycles 1810, end_of_data condition 1812 is generated. The end_of_data condition 1812 sets the state machine in STATUS state 1814. Under PG_WAIT or GNTCHK or PG_BUSY state, the validity of the SPSYNC is tested to generate the frame-error condition 1830, 1832, 1834, in the event of a SPSYNC failure and the state machine performs a transition to the IDLE state.

A gnt_valid condition 1816 for a port-group is active, when if the port-group has an active (SOPC, EOPC or MOPC) and results in PG_BUSY state 1818.

Referring to FIG. 17, each port group 1710 has a dedicated barrel shifter 1712. The HiPAS element has 16 shifters to support up to 16 port-groups. With respect to FIG. 18, the barrel shifter is in idle state 1802 until a Gnt_valid indication 1816 is received from the corresponding port group. The Gnt_valid 1816 from PGn sets the barrel shifter-n (BS-n) in active state and selected data segment from PGn (by the RXDSMUX) is shifted into (BS-n). The cell word assembly operation is performed in parallel for all port groups that have an active cell transaction on the Rx port interface 1700.

Each barrel shifter 1712 can be considered as a DMA channel and a data transfer to a cell staging buffer is initiated when the data word in BS-n is assembled completely. Under the STATUS state 1814, the TxStatus word from the PAC bus is latched on PACFCS port 1750, for the Tx-port operation.

Referring to FIG. 16, the cell staging buffer (CLSTGBUF) 1606 is a multi-port RAM or register file, which resides in the HiPAS element. The cell buffer partitions in the CLSTGBUF 1606 can be configured during initialization. Functionally, each cell buffer can be considered as a cell FIFO and the pointers are managed by independent buffer management blocks.

With reference to FIG. 17, the Rx port DMA controller (RXDMAC) 1720 block monitors the service requests from the barrel shifter 1712 and implements a multi-channel DMA controller function 1722. The FIFO pointers for Rx cell buffer FIFO in the CLSTGBUF are received through the cell staging buffer management (CSBMRX) interface 1740 from the staging buffer manager, CSBMAN 1640 (in FIG. 16).

The RXDMAC 1720 provides the BS2RxWP control 1724 to select appropriate barrel shifter 1712 to the RXWP Interface controller block 1726. The RxDMA 1720 provides address and control information to RxWP interface controller 1726 through the RXWP DMA Control interface signals 1722. The RXWP Interface controller 1726 implements the necessary RAM interface protocol to complete the data transfer and sends data transfer acknowledgment to the RXDMAC 1720.

The Rx-port scheduler (RXSHDL) interface 1734 operates synchronously with the PAC bus clock, PCLK and provides receive cell or packet data transfer scheduling control information to the CBSHDL block 1660 (in FIG. 16). The RxSHd block 1736 implements the necessary timing and handshaking for the RXSHDL interface signals consisting of Rx-port scheduling ready indications, RxGnt indications, RxCell Routing Information and handshake acknowledgment.

Now referring to FIG. 16, the SCON interface unit (SCBIU) 1620 controls cell data transfer between the CLST-GBUF and the external shared memory. The RxCell buffer pointer write Operation on the SC bus provides the free cell buffer pointer into which the received cells are to be written. The RxCell buffer pointers are allocated on per port group basis and are queued into all of the HiPAS elements in the switch fabric. Each pointer data has a reference tag associated with it to simplify the transaction between the HiPAS and the fabric controller. Also, the RxCell buffer pointer write Operation provides the packet status (SOPC/MOPC/EOPC) information for the packet transfer mode of operation.

The switch fabric controller (SCON) contains the input cell buffer manager and output cell buffer manager which are responsible for controlling the operations of the shared memory switch fabric.

The RxCell RI read Operation on the SC bus interface 1608 allows the SCON to fetch the routing information of a received cell. The RI information from each HiPAS element (all elements read in parallel) is received in a bit serial format. Also, the RI information of a cell is bit interleaved and the number of bits/data segment interleaved between the HiPAS elements depends on the fabric configuration. The RI of a cell from the PG is multiplexed by the SCON. This operation is similar to the data assembly operation in the Rx port interface unit in the HiPAS element.

The Cell buffer Reference Tag collection Operation provides the Rx cell buffer pointer associated with the RI. The Rx Cell buffer pointer associated with the RI is informed by sending the corresponding reference tag attached with the Rx cell buffer pointer. The reference tag is used to minimize the number of transactions on the SC bus.

For multistage switching, the HiPAS elements are configured to send the multistage routing information word. Based on the RI, the SCON switches the cells into appropriate destination FIFO. The multicast and unicast switching are performed by the SCON.

Under the packet transfer mode operation, the packet routing information bytes (RIbytel-4, MSbytel-4 and CCbytel-2) are provided in the start-of-packet segment only. The routing information are saved in internal registered and preserved until the packet transfer is completed with an end-of-packet segment.

Figure 19:
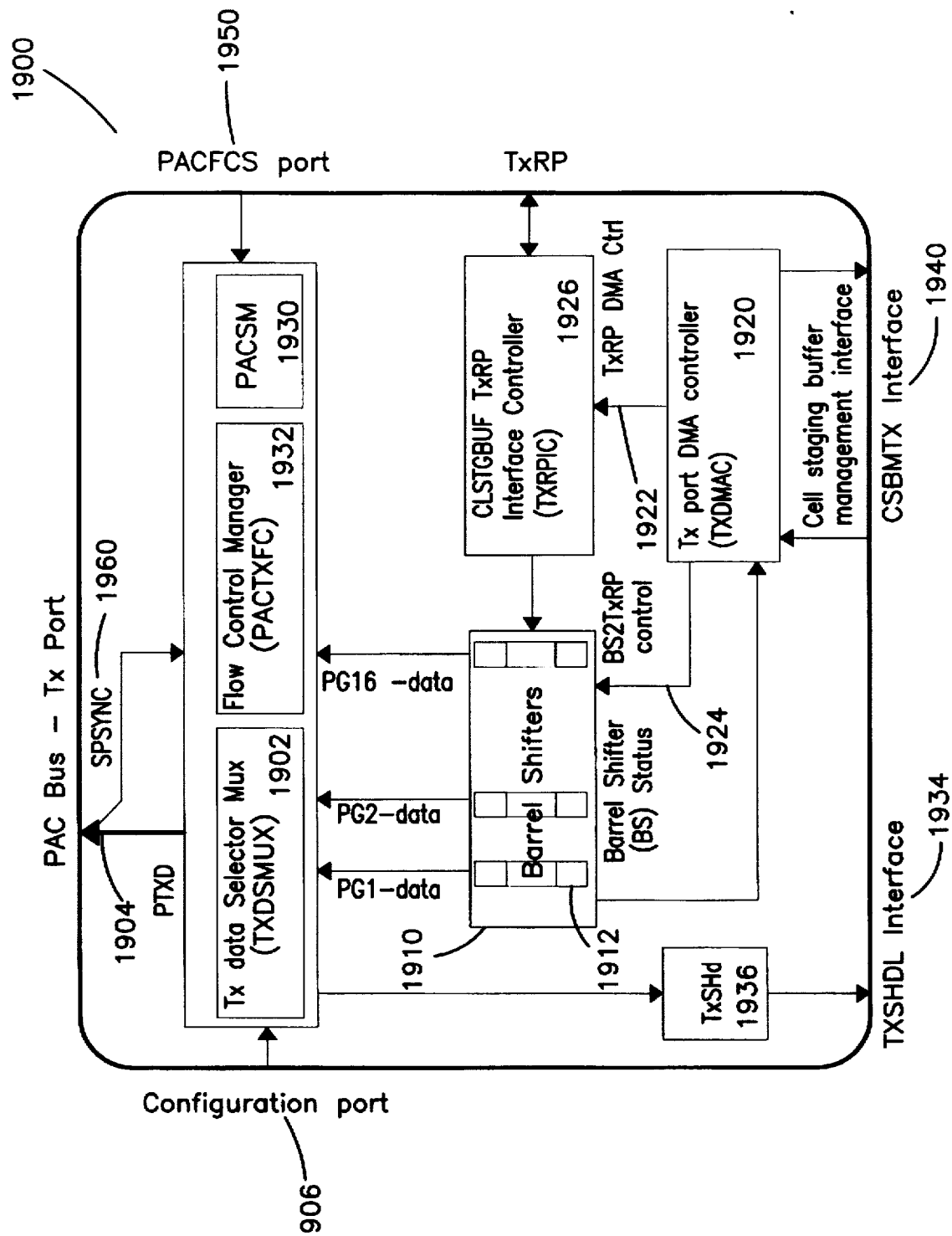
FIG. 19 illustrates a detailed block diagram of the Tx port interface function illustrated in FIG. 16 according to the present invention.

The detailed block diagram 1900 of the Tx port interface function 1650 illustrated in FIG. 16 for the HiPAS element is shown in FIG. 19. A Tx Cell transaction is initiated when a output cell is scheduled through the SC bus interface. The PAC bus Tx port operations are synchronized with the SPSYNC 1960. The SC bus interface operations are synchronized with the SCSYNC. The switch fabric sync, SPSYNC and SCSYNC, synchronize the internal operations of all of the HiPAS elements in the switch fabric. Thus, the Tx datapath operations of the corresponding port group are also synchronized.

The TxCell buffer pointer write Operation on the SC bus interface provides the cell buffer pointer from which the cell data from the shared memory CBRAM (see FIG. 16) to be transferred on the Tx port.

In addition, the TxCell buffer pointer write Operation TxCell provides the cell buffer reference tag for the buffer management and packet status information (start/middle/end) for the packet mode operation. Referring to FIG. 16, the cell data read from the cell buffer memory banks are staged into the common staging cell buffer (CLSTGBUF) 1606 in the HiPAS element. The TxCell staging and staging buffer management are controlled by the staging buffer management block 1640.

Referring to FIG. 19 again, each port group has a dedicated barrel shifter 1912. The HiPAS element has 16 shifters 1912 to support up to 16 port-groups. The barrel shifter 1912 is in idle state until an active cell or packet segment is scheduled for the corresponding port group. Each barrel shifter 1912 can be considered as a DMA channel and a data transfer from the cell staging buffer is initiated when a data word is disassembled completely.

The Tx port DMA Controller (TXDMAC) block 1920 monitors the service requests from the barrel shifter and implements a multi-channel DMA controller function. The FIFO pointers for Tx cell buffer FIFO in the CLSTGBUF are received through the cell staging buffer management (CSBMTX) interface 1940 from the staging buffer manager CSBMAN 1640 (in FIG. 16).

Now with reference to FIG. 19, the TXDMAC 1920 provides the BS2TxRP control 1924 to select appropriate barrel shifter to the TxRP Interface controller block 1926. The TXDMAC provides address and control information to RXRP interface controller 1926 through the RxRP DMA Ctrl interface signals 1922. The TxRP Interface controller 1926 implements the necessary RAM interface protocol to complete the data transfer and sends data transfer acknowledgment to the TXDMAC 1920.

The TXDSMUX block 1902 assembles the port-group data elements into 16-bit PAC Bus data word. The PAC bus word is assembled using the Number-of-PGs and the datapath configuration (4X155 or 1X622 mode).

The PACSM 1930 implements the PAC Bus protocol for the Tx port 1904. The PAC bus flow control manager for the Tx-port (PACTXFC) 1932, assembles the PAC bus Tx-port status information for each port group and controls the flow of transactions on the PAC bus Tx-port.

A TxCell_Ready status indication on each port-group 1910 is provided by the corresponding port-group barrel shifter 1912. When the TxCell is scheduled by the DMA channel 1920, the associated packet status (start/middle/end) is also provided to the TXDSMUX 1902. The TXDSMUX 1902 receives the TxStatus from the Rx-port block. The TxStatus indicates, if the Tx-port receiver on the PAC bus is ready to receive a transaction on the Tx-port 1904. The PAC Bus state machine on the Tx-port and Rx-port are the same, except for the datapath operations.

With reference to FIGS. 18 and 19, the barrel shifter of a port-group is in idle state 1802 until a Gnt_valid indication 1816 is received from the corresponding port group. The Gnt_valid 1816 from PGn sets the barrel shifter-n (BS-n) 1912 in active state and selected data segment form PGn (by the TXDSMUX) is shifted from (BS-n). The cell word disassembly operation is performed in parallel for all port groups that have an active cell transaction on the Tx port interface.

Each barrel shifter 1912 can be considered as a DMA channel and a data transfer from a cell staging buffer is initiated when the data word in BS-n is disassembled completely. Then with reference to FIG. 16, the cell buffer management interface 1640 provides the current buffer status for the Rx-port. This status per port-group indicates, if the switch fabric Rx-port is ready to receive a next transaction on the Rx-port. Under the STATUS state 1814, the RxStatus word on the PACFCS port 1950 from the buffer manager is transferred on the PAC bus Tx-port.

The Tx-port scheduler (TXSHDL) interface 1934 operates synchronously with the PAC bus clock, PCLK and provides transmit cell or packet data transfer scheduling control information to the CBSHDL block 1660 (in FIG. 16). The TxSHd block 1936 implements the necessary timing and handshaking for the TXSHDL interface signals consisting of Tx-port scheduling ready indications, TxGnt indications and handshake acknowledgment.

When the scheduled Tx cell transaction is completed on the Tx port, the reference tag associated with the Tx cell buffer pointer is transferred to the SCON on the SC bus 1608 through the Cell buffer Reference Tag collection Operation. The switch status information associated with the current cell transfer or the port group are obtained through the SC bus interface 1608 are maintained in the internal status registers. During the Tx Cell data transfer cycle, the switch status information is transferred by the PAC bus__PG status port interface block. Similarly, during the Rx cell transaction, the port status information is collected through the status port interface.

With reference to FIG. 16, the PAC bus status port controller (PACSPU) 1670 allows to status exchange between the switch fabric and the Phy-port device. The PACSPU contains a switch port adapter status collection unit and a switch fabric status transfer unit which implements a bit-serial input (PSTAT) port and output (SSTAT) port respectively. The bit serial frame is synchronized with the SPSYNC on the PAC bus.

The interface between the PACSPU and the SCBIU contains two sections-one is the datapath interface and the second is the handshaking interface. The datapath interface is the status RAM (STATSRAM) through which the received Phy-port status is written and the switch status is read. The handshaking interface is used to indicate the availability of the status frame data between the blocks.

The CSBMAN block manages the cell buffer allocation and deallocation of the cell buffers in the cell staging RAM. The CSBMAN uses independent buffer pointer queues to implement the staging buffer management. The detailed functional block diagram 2000 of the buffer manager is shown in the FIG. 20, contains PAC bus Receive unit request interface (CSBMRX 2020) controller (PRXICTRL) 2002, PAC bus Transmit unit request interface (CSBMTX 2022) controller (PTXICTRL) 2004, Cell buffer transfer scheduler request interface (CSBMXFR 2024) controller (XFRICTRL) 2016, Multi-port Rx staging buffer queues RAM or Register File (RXBQRAM) 2008, Multi-port Rx buffer queue pointer RAM or Register File (RXQPTR) 2006, Multi-port Tx staging buffer queues RAM or Register File (TXBQRAM) 2012, Multi-port Tx buffer queue pointer RAM or Register File (TXQPTR) 2012 and Staging buffer assignment mapping (BMAPROM) 2010, which may be based on ROM or fixed logic.

The CSBMAN block interconnects the PACRXIU and PACTXIU blocks through the Rx port cell staging buffer management (CSBMRX) Interface and Tx port cell staging buffer management (CSBMTX) Interface respectively. The CSBMAN receives Free Rx buffer requests and Rx buffer ready requests that are requested by the PACRXIU block. Similarly, Tx buffer requests and Tx buffer release requests are received from the PACTXIU on the CSBMTX interface. All of the received service requests are queued and translated into four service request functions (Transfer Rx buffer to CBRAM request, Rx buffer free request, Transfer CBRAM to Tx buffer request, Tx buffer ready request) to the CBSDL block through the Cell buffer transfer management (CSBMXFR) Interface. In addition, CSBMAN receives the necessary configuration information from the configuration register block.

The CSBMAN maintains 16 cell buffer pointer queues (one per port-group) for each of the following service categories:

1. Rx Free Buffer Queues—RXFBQ
2. Rx Buffer Ready Queues—RXBRQ
3. Tx Free Buffer Queues—TXFBQ
4. Tx Buffer Ready Queues—TXBRQ Each queue is managed with two pointers—a front pointer and a rear pointer and status information is provided through two flags a queue full flag and a queue empty flag. When a buffer address is enqueued into a queue, the rear pointer of the corresponding queue is incremented (mod N counter) and when the buffer address is dequeued from the queue, the front pointer is incremented. The queue full flag is evaluated when the queue rear pointer gets updated and the queue empty flag is evaluated when the queue front pointer gets updated. The flag status is evaluated using the following logic:

if (queue front=updated queue rear+1) then queue full= true;

if (queue rear=updated queue front) then queue empty= true.

The Rx buffer management queues are maintained in the RXBQRAM 2008 and the queue pointers in the RXQPTR block 2006. The Tx buffer management queues are maintained in TXBQRAM 2012 and the associated pointers in the TXQPTR block 2014. The RXBQRAM and TXBQRAM are 4-port RAMs (2 read and 2 write) and the RAM ports are assigned to service Rx-requests and Tx-requests. The stream requests are operated in a pipeline controller, which reads the queue pointers from the pointer RAM, accesses the buffer queue RAM and updates the pointer RAM. The pointer RAMs are 4-port RAM or register file blocks. On power-up or through soft reset, the buffer assignments and buffer pointers are initialized using the BMAPROM 2010. During the normal operation, the multi-port access on the RXBQRAM and TXBQRAM are contention free, since the access on the ports are controlled by the queue pointers. In order to prevent contention on the pointer RAM accesses, the service requests are initiated and processed in a pre-fixed sequence (with reference to SPSYNC or SCSYNC) as shown in FIG. 36.

The 16b 3602 and 4b 3604 columns in the FIG. 36 indicate the 16-bit (1×622 Mbps) and 4-bit (4×155 Mbps) datapath modes of the PAC bus interface. The CSBMRX 3606 and CSBMTX 3608 are sync with SPSYNC (switch fabric sync on the PAC bus) and CSBMXFR 3610 is in sync with SCSYNC (switch fabric sync on the SC bus).

Figure 20:
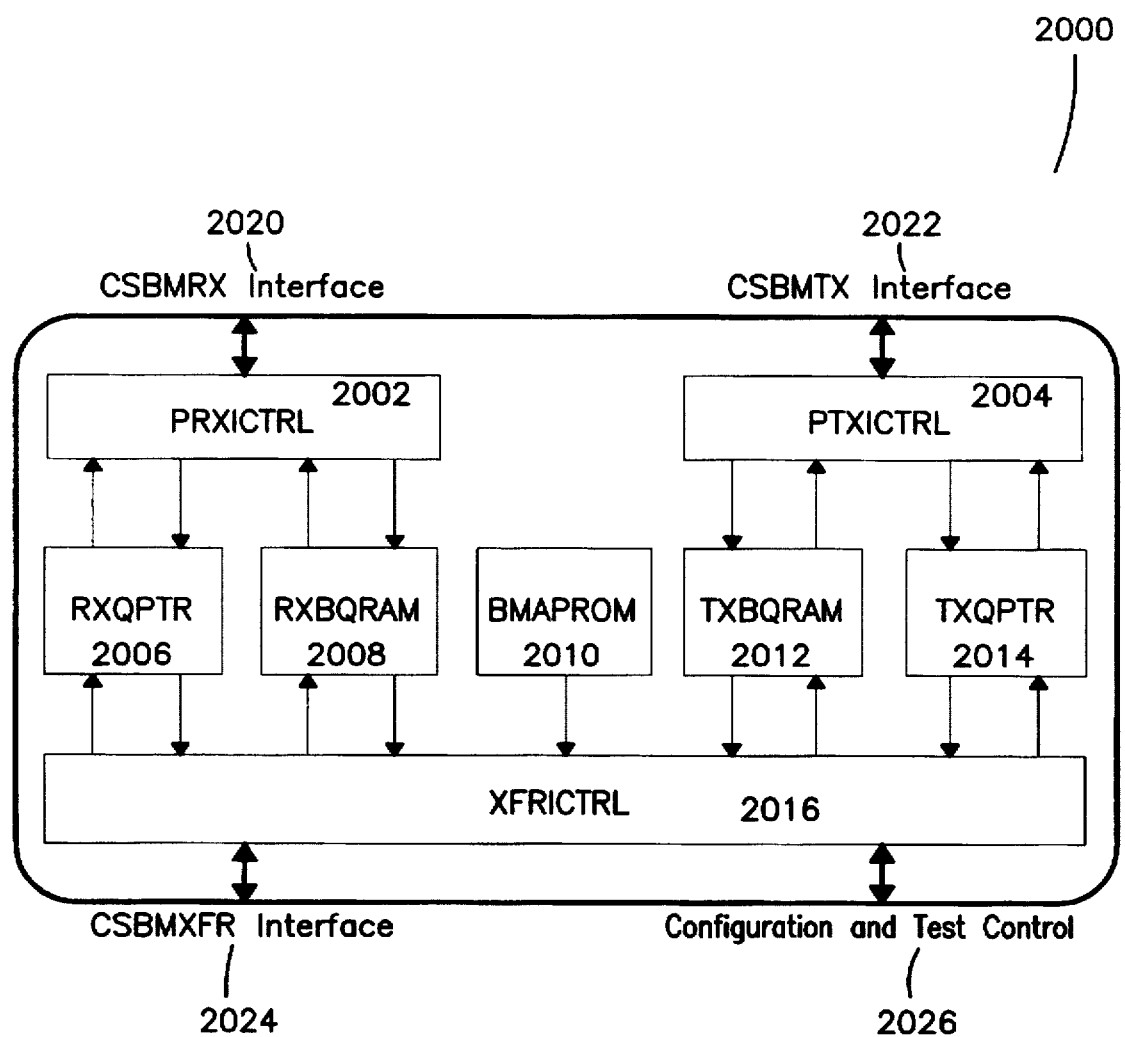
FIG. 20 illustrates a detailed block diagram of the cell staging buffer manager function illustrated in FIG. 16 according to the present invention.

Referring to FIG. 20, the shared memory scheduler interface controller (XFRICTRL) 2016 is responsible for synchronizing the operations of the CSBMXFR interface with reference to SCSYNC. Since the service functions are in a pre-assigned slots with reference to SCSYNC, the buffer queue pointer information need not be sampled and latched (on SCSYNC). This is based on the assumption that the CBSHDL block request operations are completed during the phase-1 of request sequence. During the phase-1, Rx buffer request and Free Tx buffer requests operations are initiated internally by the CSBMAN. The XFRICTRL 2016 block operations are essentially pre-fetch or a pipeline stage the information from the RXBQRAM 2008 and TXBQRAM 2010 to service the requests on the CSBMTX interface 2024.

The CBRAM Access Scheduler (CBSHDL) receives the Rx and Tx transaction status information, internal staging buffer status information and shared memory buffer control information respectively from PAC bus interface block, CSBMAN and SCBIU. The detailed functional block diagram of the CBRAM Access Scheduler (CBSHDL) is shown in the FIG. 21. The CBSHDL block interfaces are the following:

1. Rx port scheduler (RXSHDL) interface 2102
2. Tx port scheduler(TXSHDL) interface 2104
3. Cell buffer transfer management (CSBMXFR) interface 2106
4. Switch controller (SCXF) interface 2108
5. CBRAM Request (CBRAMREQ) interface 2110
6. Configuration and Test Control Interface 2112

Figure 21:
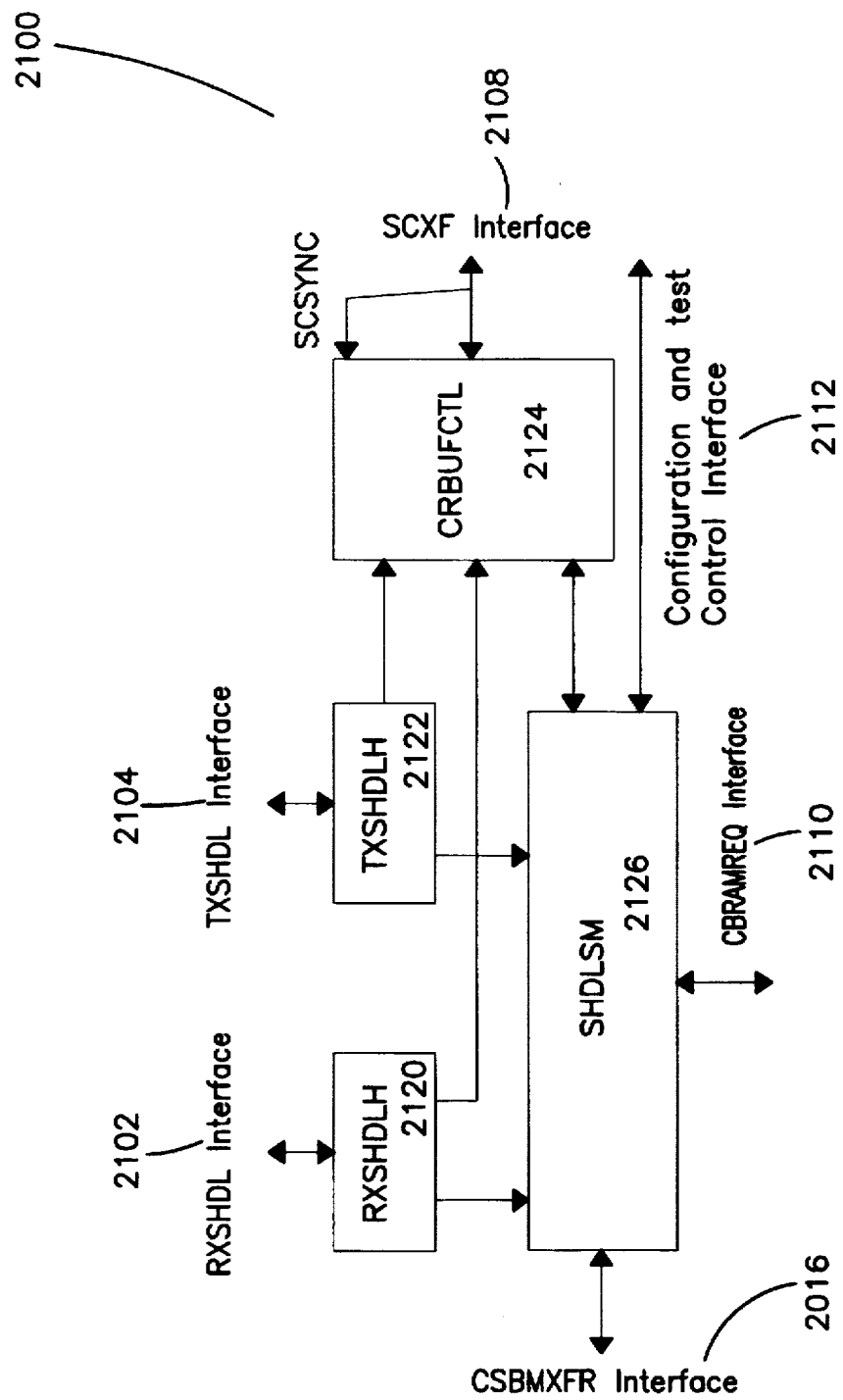
FIG. 21 illustrates a detailed block diagram of the shared cell buffer memory access scheduler function illustrated in FIG. 16 according to the present invention.

With reference to FIG. 21, the CBSHDL block 2100 processes the information from RXSHDL 2102 and TXSHDL 2104 interfaces and synchronize with reference to SCSYNC. The CSBMAN block maintains the CSBMXFR interface information to be synchronous with reference to SCSYNC. The external shared memory buffer control information is received through SCXF interface. On SCSYNC, shared memory control information are latched internally by the CBSHDL block. The SCSYNC synchronization control allows to synchronize the operations in all of the HiPAS devices in the fabric. Based on the latched status information, the CBSHDL, schedules and controls the cell flow between the external CBRAM and the internal cell staging buffer.

The RXSHDLH 2120 and TXSHDLH 2122 implement the synchronizers for the RXSHDL interface 2102 and TXSHDL interface 2104 respectively. The CRBUFCTL 2124 maintains the shared memory buffer control information that are received via SFX interface 2108 from the SCBIU block. Based on the Rx-port status from the RXSHDLH, CRBUFCTL allocates the CBRAM receive buffers and formats the RxCell switching control information. Similarly, based on the Tx-port status from the TXSHDLH, CRBUFCTL allocates CBRAM transmit buffers and formats cell buffer reference tag information.

The CRBUFCTL block operations are synchronized with the SCSYNC. Under the ATM cell transfer mode, all cell transactions have the fixed length and each transaction has a fixed cell buffer reference. Under the packet transfer mode, CRBUFCTL 2124 has to support the packet buffer management in addition to the shared memory data transfer scheduling. On Rx-port 1602 transactions, the CRBUFCTL 2124 maintains a packet segment counter (PBSEG_counter) for each port-group. The packet buffer size (PBSIZE) in the external memory is configured in terms of the packet segment/cell size (which is the transaction size on the PAC bus). The PBSEG_counter is set to zero on every new packet (SOCP) transaction and the counter is incremented on the following valid packet transactions.

If the PBSEG_counter reaches PBSIZE, a new packet buffer is fetched from the free buffer queue, and the RxCell RI read Operation and Cell buffer Reference Tag collection (for Rx-port) Operation on the SC bus interface are validated. For the latter, the packet buffer reference tag and the received packet status (SOCP/MOPC/EOPC) are provided for the SC bus interface operations.

If the EOPC status is active a new packet buffer is fetched from the free buffer queue and the RxCell RI read operation and Cell buffer Reference Tag collection (for Rx-port) on the SC bus interface are validated. The packet buffer reference tag, EOPC indication and the number of valid PAC bus transaction segments are provided from the PBSEG_counter.

On Tx-port transactions, the CRBUFCTL receives the packet buffer pointer, packet status (start/middle/end) and the valid number of PAC bus transactions (packet segment count—NPBCUNT) for each port-group. As in the case of Rx-port, a PBSEG_counter per port group is maintained. The PBSEG_counter is set to zero on every new packet (SOCP) transaction and the counter is incremented on the following valid packet transactions.

If the PBSEG_counter reaches NPBCUNT and packet status is EOPC, the next Tx-packet buffer is fetched from the Tx-buffer queue; and the Cell buffer Reference Tag collection (for Tx-port) on the SC bus interface is validated.

With reference to FIG. 21, the CBRAM access scheduler state machine (SHDLSM) block, 2126 schedules the shared cell buffer memory access for the HiPAS element. All of the HiPAS elements in the switch fabric unit operate synchronously and perform the same cell access operation. The access scheduling synchronization is achieved with the common SCSYNC signal. On every SC Bus synchronization, SCSYNC event, the following access schedule control information from different interfaces are sampled and latched:

1. Cell received from Rx port of PAC bus interface for all of the configured port-groups, received from RXSHDLH 2120 via RXSHDL interface 2102.
2. Free/Receive cell buffer pointer queue status for all of the port-groups, received from CRBUFCTL 2124 via SCXF interface 2108.
3. Cell transmitted through the Tx port of PAC bus interface for all of the configured port-groups, received from TXSHDLH 2122 via TXSHDL interface 2104.
4. Output/Transmit cell buffer pointer queue status for all of the port-groups, received from CRBUFCTL 2124 via SCXF interface 2108.
5. Receive cell buffer staging FIFO status for all port-groups, received via CSBMXFR interface 2106.
6. Transmit cell buffer staging FIFO status for all port-groups, received via CSBMXFR interface 2106.

Based on the latched status information, the CBRAM access is scheduled. The available clock cycles are equally distributed to all of the configured port-groups. Depending of the port-group status, the slot may be unused or idle. The RAM access requests are initiated through the CBRAMREQ interface 2110.

Figure 22:
FIG. 22 illustrates shared buffer memory (RAM) access scheduling for different fabric configurations according to the present invention.

Assuming the configured number of clock cycles=34, (for ATM cell switching at 50 Mhz, 16-bit bus rate.) The RAM (for example, with 32-bit datapath) access scheduling 2200 for different fabric configurations are illustrated in FIG. 22.

With reference to FIG. 16, the CBRAMIU 1680 receives shared memory access requests from the CBSHDL block, 1660 through the CBRAMREQ interface 2110 (with reference to FIG. 21). The CBRAMIU contains a DMA controller and a RAM interface controller. The DMA controller performs data transfers between the external shared memory and the internal staging buffer memory. In addition, The RAM interface controller implements the necessary RAM access protocol, for example, synchronous SRAM access protocol.

With reference to FIG. 16, the SCBIU 1620 implements the SC bus interface 1608 protocol and operations. The SCBIU block provides direct interface to the SC bus, which interconnects the HiPAS element to the switch fabric controller (SCON).

Figure 23:
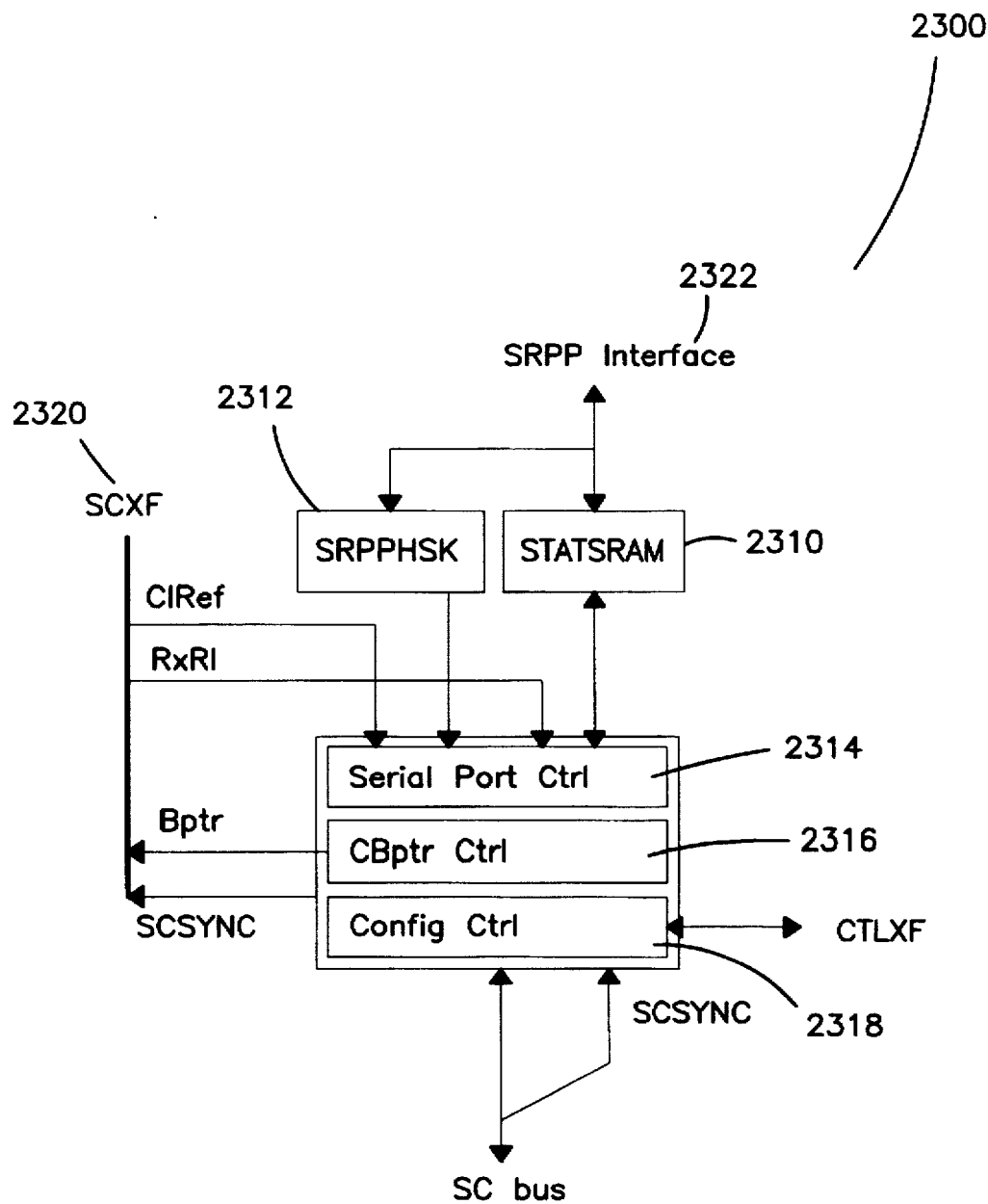
FIG. 23 illustrates a detailed block diagram of the SC bus interface unit function illustrated in FIG. 16 according to the present invention.

The detailed functional block diagram of the SCBIU is shown in FIG. 23. The STATRAM 2310 is used to maintain the port status information and the switch fabric status information. The SRPPHSK block 2312 implements the necessary handshaking protocol between the SCBIU and PACSPU blocks to control the information exchange between the blocks. The SCBIU contains three functional units (Serial Port Ctrl 2314, Config Ctrl 2316 and CBptr Ctrl 2318) which implements the operations on the SC bus and provides direct interfaces to the configuration register block and CBSHDL block. The cell reference tag (ClRef), Routing information (RxRI) and buffer pointer (Bptr) information are exchanged between the CBSHDL and SCBIU through the SCXF interface 2320. The PAC bus status input and output information are exchanged through a RAM (STATSRAM) interface (SRPP interface) 2322 to the PACSPU block.

The SCBIU implements all of the basic SC bus operations, e.g., the HiPAS configuration operation, RxCell buffer pointer write operation, TxCell buffer pointer write operation, RxCell switching control data read operation, Cell buffer reference tag collection operation and switch fabric status report operation.

The switch element (HiPAS) configuration operation is where the HiPAS elements in the switch fabric are configured by the switch fabric controller (SCON) during initialization under the external processor control. The external processor initiates configuration operation by writing information into appropriate memory mapped control registers in the SCON. The HiPAS element address for configuration is hard-wired by connecting one dedicated SESPD bit line to the HiPAS configuration select control line, SECSEL. During the device configuration transaction operation (when SFCMD='11'b), the configuration registers of the selected device can be accessed through SECDATA path.

Figure 24:
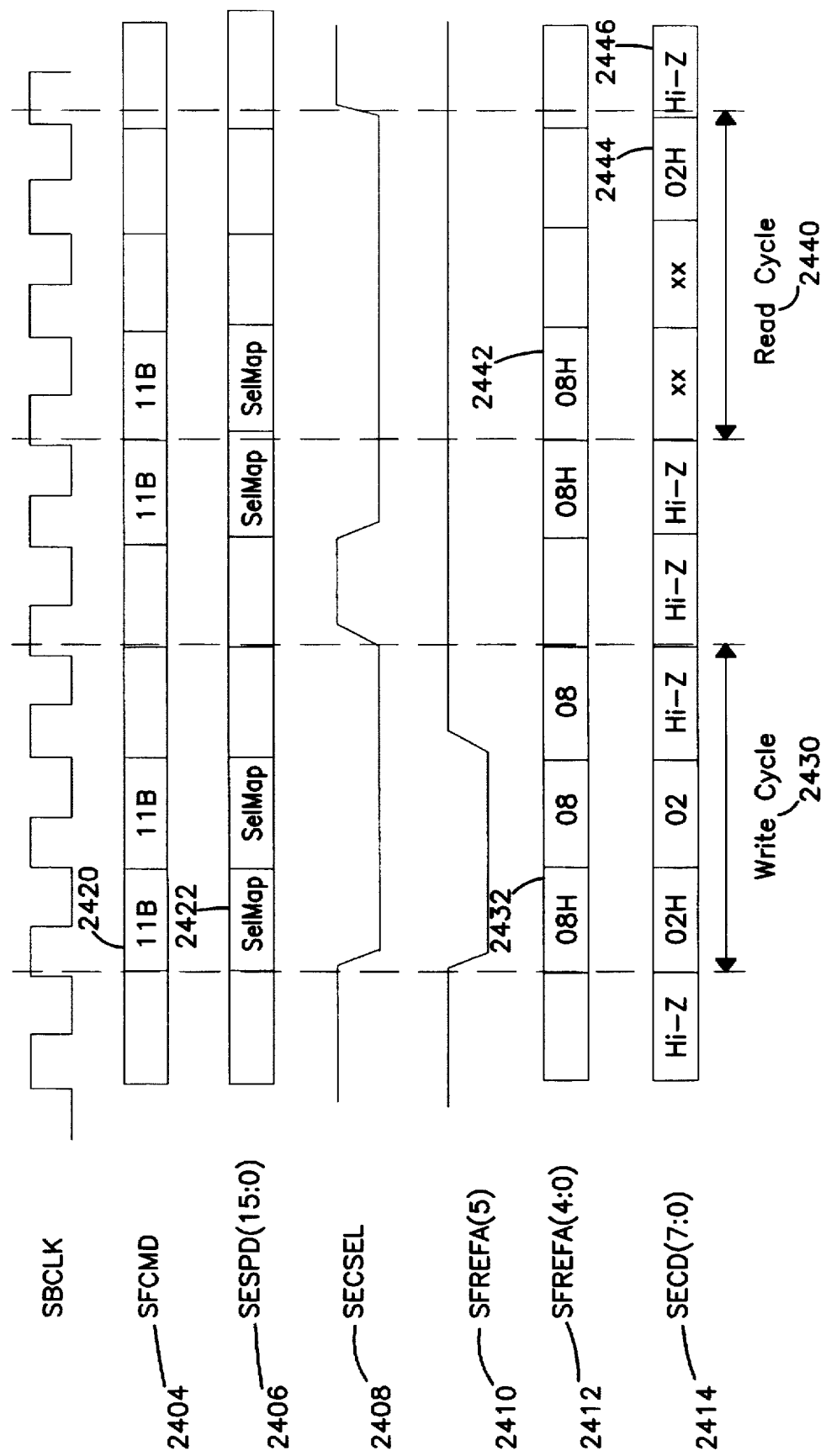
FIG. 24 illustrates the SC bus configuration transaction cycle operation and the timing according to the present invention.

The HiPAS configuration transactions on the SC bus are illustrated in the FIG. 24. Each HiPAS in the fabric is assigned a fixed ID and it is hard-wired by connecting one of the bit lines in the SESPD 2406, data bus to the SECSEL 2408. The configuration transaction is identified by setting the SFCCMD 2404 bits to "11"B 2420. The high order bit, SFREFA(5) 2410, specifies the read/write control for the configuration transaction and the other five bits, SFREFA (4:0) 2412 specify the internal device register address. The 8-bit bidirectional data bus, SECD 2414 carry the transaction data. The HiPAS selection bit map (SelMap 2422) on SESPD asserted by the Switch fabric controller has an active low indication on the corresponding bit (of the HiPAS ID) which is connected to the SECSEL 2408 signal pin. The write cycle 2430 may require 3 clocks and the figure illustrate the write operation on the registers 8H 2432. The read cycle 2440 may require 4 clocks and the figure illustrates the read operation on the same register 2442. The control data bus, SECD is driven by the HiPAS during the configuration read access 2444 cycles only and during all other transaction, the HiPAS keeps SECD bus in high impedance state 2446.

Figure 25:
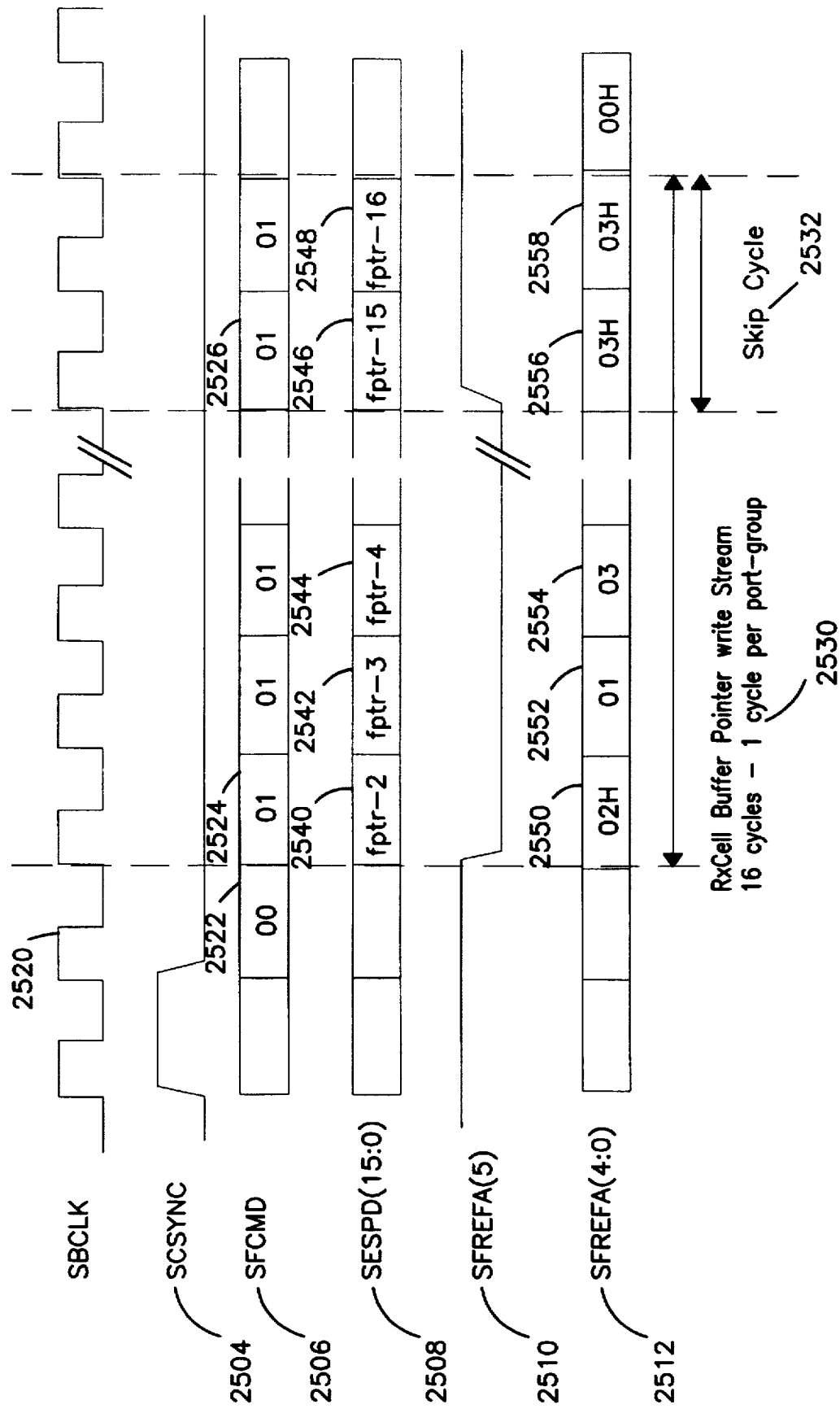
FIG. 25 illustrates the SC bus RxCell buffer pointer write transaction cycle operation and the timing according to the present invention.

The RxCell buffer pointer write operation is a stream write transaction on the SC bus and it is synchronized with the SCSYNC. For example in the case of 16-bit PAC bus where the number of HiPAS in a single stage is limited up to 16, the RxCell (and TxCell) buffer write stream is 16 cycles long and contains the pointer data for the port-group 0 through 15 respectively. The RxCell buffer pointer write transaction cycles are illustrated in the FIG. 25. The first cycle 2520 following the SCSYNC 2504 is always a control data cycle. The control data cycle is not used for the RxCell Buffer pointer write operation. The SFCMD 2506 bits are set to "01"B 2524 to indicate the RxCell buffer write transaction. Each write cycle (one per port-group) in the stream is controlled with an active low write enable indication. During the transaction cycle, the switch fabric controller drives the following information on the SC bus:

1. SESPD 2508 data bus holds the buffer pointer data 2540.
2. The high order bit, SFREFA(5) 2510, specifies the write enable control.
3. The lower 5-bits, SFREFA(4:0) 2512 holds the buffer pointer reference tag 2550.

The timing diagram illustrates active write cycles for port-group IDs 0 through 13 (first 14 cycles following the SCSYNC) 2530 and the write skip cycles 2532 on the port-group IDs 14 and 15.

Figure 26:
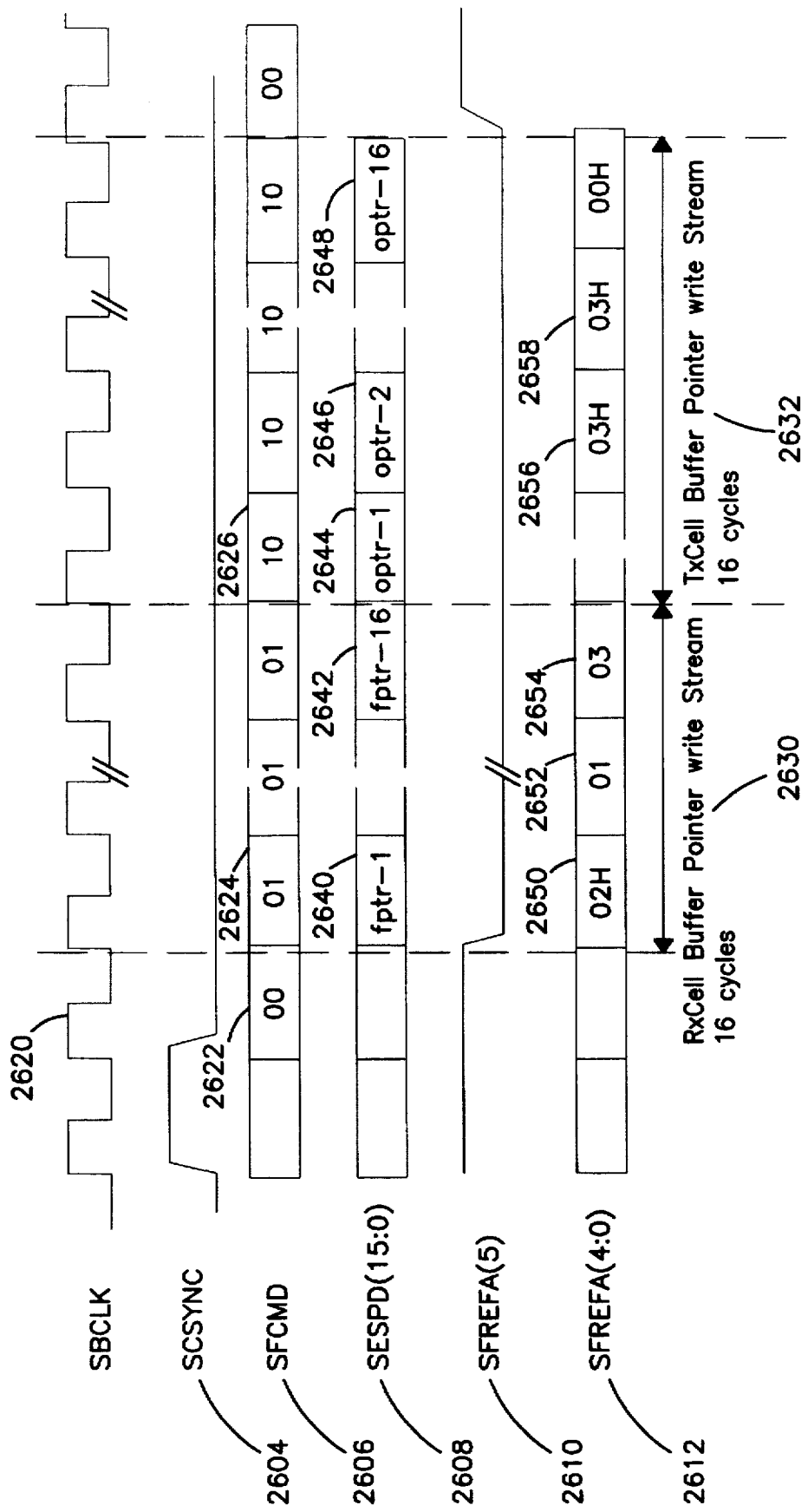
FIG. 26 illustrates the SC bus TxCell buffer pointer write transaction cycle operation and the timing according to the present invention.

In the TxCell buffer pointer write operation, the SCON writes the pointer value along with reference tags into the HiPAS elements. The TxCell buffer pointer write operation is also a stream write transaction on the SC bus and it follows the RxCell buffer pointer write stream. The TxCell buffer pointer write transaction cycles are illustrated in the FIG. 26. The TxCell buffer write stream 2632 begins after 16 cycles following the SCSYNC 2604. The TxCell buffer write stream 2632 is 16 cycles long and contains the pointer data 2644 to 2648 for the port-group 0 through 15 respectively. The TxCell buffer pointer write operations and the transaction cycles on the SC bus are similar to that of RxCell buffer pointer transaction cycles. Although, both stream operations are relatively synchronized with reference to SCSYNC, an additional transaction integrity is provided through the different SFCMD 2626 bit encoding for the Rx and Tx transactions on the SC bus. The SFCMD bits are set to "10"B to indicate the TxCell buffer write transaction. Each write cycle (one per port-group) in the stream is controlled with an active low write enable indication. During the transaction cycle, the switch fabric control drives the following information on the SC bus:

1. SESPD 2608 data bus holds the buffer pointer data 2644.
2. The high order bit, SFREFA(5) 2610, specifies the write enable control
3. The lower 5-bits, SFREFA(4:0) 2612 holds the buffer pointer reference tag 2656.

In the RxCell switching control data read operation, each HiPAS device transfers the Routing Information of the received cell through the bit serial port, RIDO. The corresponding buffer pointer reference tag transfer through the serial bit port, CLREFO is included in the cell buffer reference tag collection operation.

Figure 27:
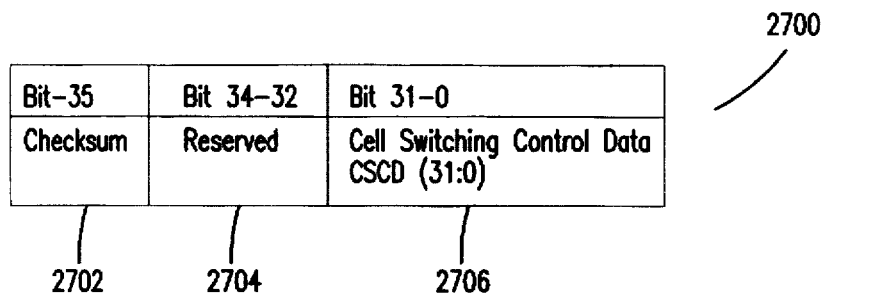
FIGS. 27 and 28 illustrate the serial data frame formats on the SC bus-RIDO port according to the present invention.

The minimum length of the RIDO serial data frame is 36 bits. The start of serial frame is synchronized with reference to the SCSYNC. The first data bit following the SCSYNC is the least significant bit (bit-0) of the frame. The cell routing information of the Rx Cell with reference to a port-group are bit sliced and interleaved among the HiPAS elements in the fabric. Based on the number of HiPAS elements in the switch fabric and configuration information, switch fabric controller, SCON selects appropriate bit slices from the serial frames received from all of the HiPAS elements and assembles the cell switching control data for respective RxCells from each port-group. The RIDO Serial frame Data format (under 1×622 Mbps mode) 2700 shown in FIG. 27 contains one bit even parity checksum 2702 for the serial data frame, three bits reserved 2704 and 32-bit cell switching control data (CSCD) 2706, which are selected and assembled based on the switch fabric configuration.

Figure 28:
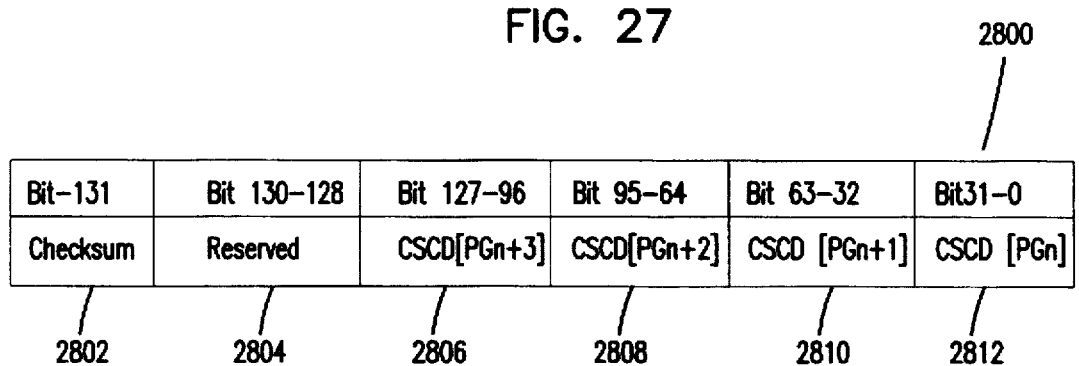

Under the 4×155 Mbps mode, the RIDO serial frame transfers routing information for 4 port-groups and RIDO frame format 2800 shown in the FIG. 28 contains one-bit even parity checksum 2802 for the serial data, three bits reserved 2804 and four 32-bit CSCD fields 2806, 2808, 2810, 2812, one field for each port-group under the HiPAS element.

Figure 29:
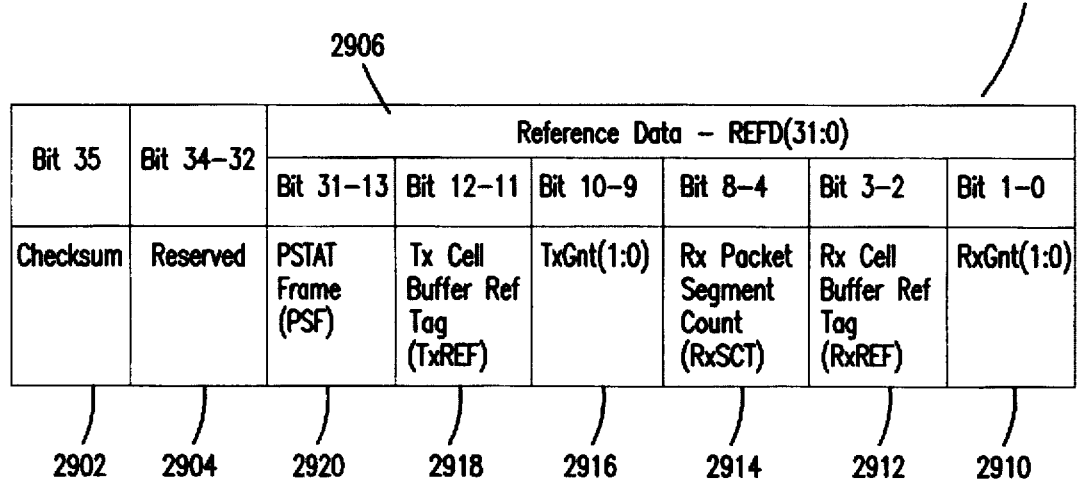
FIGS. 29 and 30 illustrate the serial data frame formats on the SC bus-CLREFO port according to the present invention.

In the Cell buffer Reference Tag collection Operation, each HiPAS transfers the cell reference information to the SCON through a bit serial port, CLREFO. The minimum length of the CLREFO data frame is 36 bits. The start of serial frame is synchronized with reference to the SCSYNC. The first data bit following the SCSYNC is the least significant bit (bit-0) of the frame. The CLREFO serial data format 2900 shown in FIG. 29 contains one bit even parity checksum 2902 for the serial data, three bits reserved 2904 and a 32-bit cell reference information (REFD) 2906.

The 32-bit REFD contains six information fields 2910, 2912, 2914, 2916, 2918, 2920 and the field descriptions are the following:

| Field | # of bits | Description |
| --- | --- | --- |
| RxGnt 2910 | 2 | RxGNT indications received on the primary port-group ID assigned to the controlling HiPAS element. |
| RxREF 2912 | 2 | Rx Cell buffer pointer reference tag. This reference tag points an allocated cell buffer for a received cell and the corresponding routing information being transferred through the RIDO serial port. |
| RxSCT 2914 | 5 | Receive packet segment count. The number of packet segment transactions associated with the referenced Rx packet transaction. |
| TxGnt 2916 | 2 | TxGNT indications of the last completed Transmit cell transaction on the primary port-group ID assigned to the controlling HiPAS element. |
| TxREF 2918 | 2 | Tx Cell buffer pointer reference tag. This reference tag points to the cell buffer from which a cell is transferred to the staging buffer and scheduled to be transmitted on the PAC bus Tx port. |
| PSF 2920 | 19 | The PSTAT frame received from the switch port adapter. PSF (0) bit indicates low-order or high-order 18-bit PSTAT frame information. |

Figure 30:
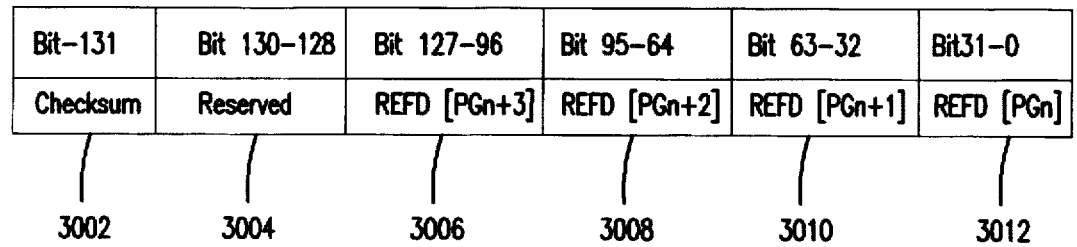
Figure 31:
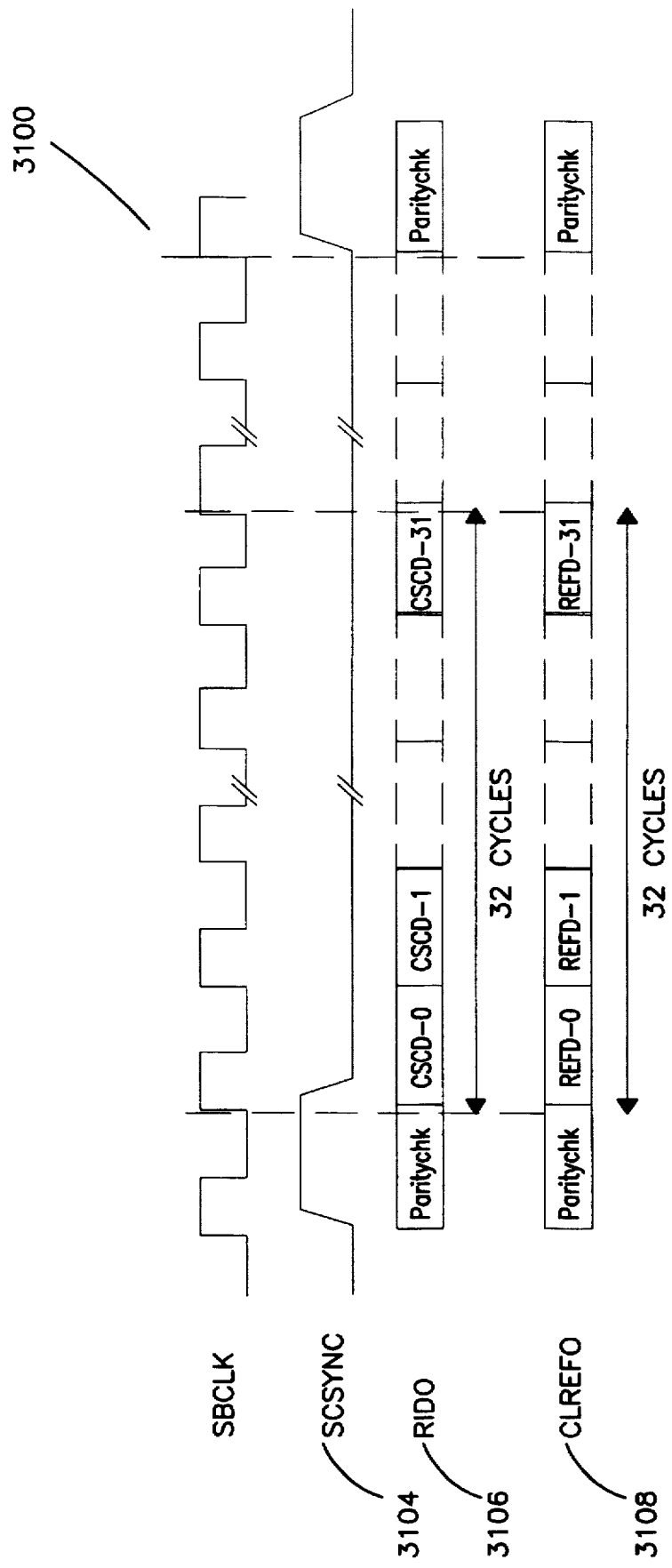
FIG. 31 illustrates the SC bus RxCell switching control information transaction cycle operation and the timing according to the present invention.

Under the 4×155 Mbps mode, the CLREFO serial frame transfers cell reference information for 4 port-groups and CLREFO frame format 3000 shown in the FIG. 30 contains on-bit even parity checksum 3002 for the serial data, three bits reserved 3004 and four 32-bit REFD fields 3006, 3008, 3010, 3012, one field for each port-group under the HiPAS element:

The RxCell switching control information transfer on the RIDO serial port 3106 and cell reference information transfer on the CLREFO serial port 3108 are illustrated in FIG. 31.

In the switch fabric status report operation, the SCON writes the switch status information through the 8-bit SECD datapath on the SC bus. The switch status stream transaction cycles are illustrated in the FIG. 32. The switch fabric status is reported on per port-group basis, which is a 16-bit word and status word format is defined by the frame control data. Using the frame control data and switch status data, each HiPAS assembles the SSTAT frame. The status report operation is synchronous with the SCSYNC 3204. The first cycle 3220 following the SCSYNC 3204 is always a frame control data cycle, which provides the status frame format information. The status information follows the frame control cycle and contains two stream write transactions 3230 and 3232, 16 cycles each. The data streaming operation is similar to those of RxCell buffer pointer write operation and TxCell buffer pointer write operation. The first status stream 3230 write transaction operates in parallel with the RxCell buffer pointer write transaction and it carries the least significant 8 bits (7 to 0) of the status word. The second status stream transaction 3232 operates in parallel with the TxCell buffer pointer write transaction and it carries the most significant 8 bits (15 to 8) of the status word. The SFCMD 3206 codes are applicable for status report transactions and the status words are always write enabled. The 16 cycles in each stream transaction represent 16 write cycles, one cycle per port-group and the port-group slots are pre-assigned as in the case of buffer pointer write operations.

Figure 32:
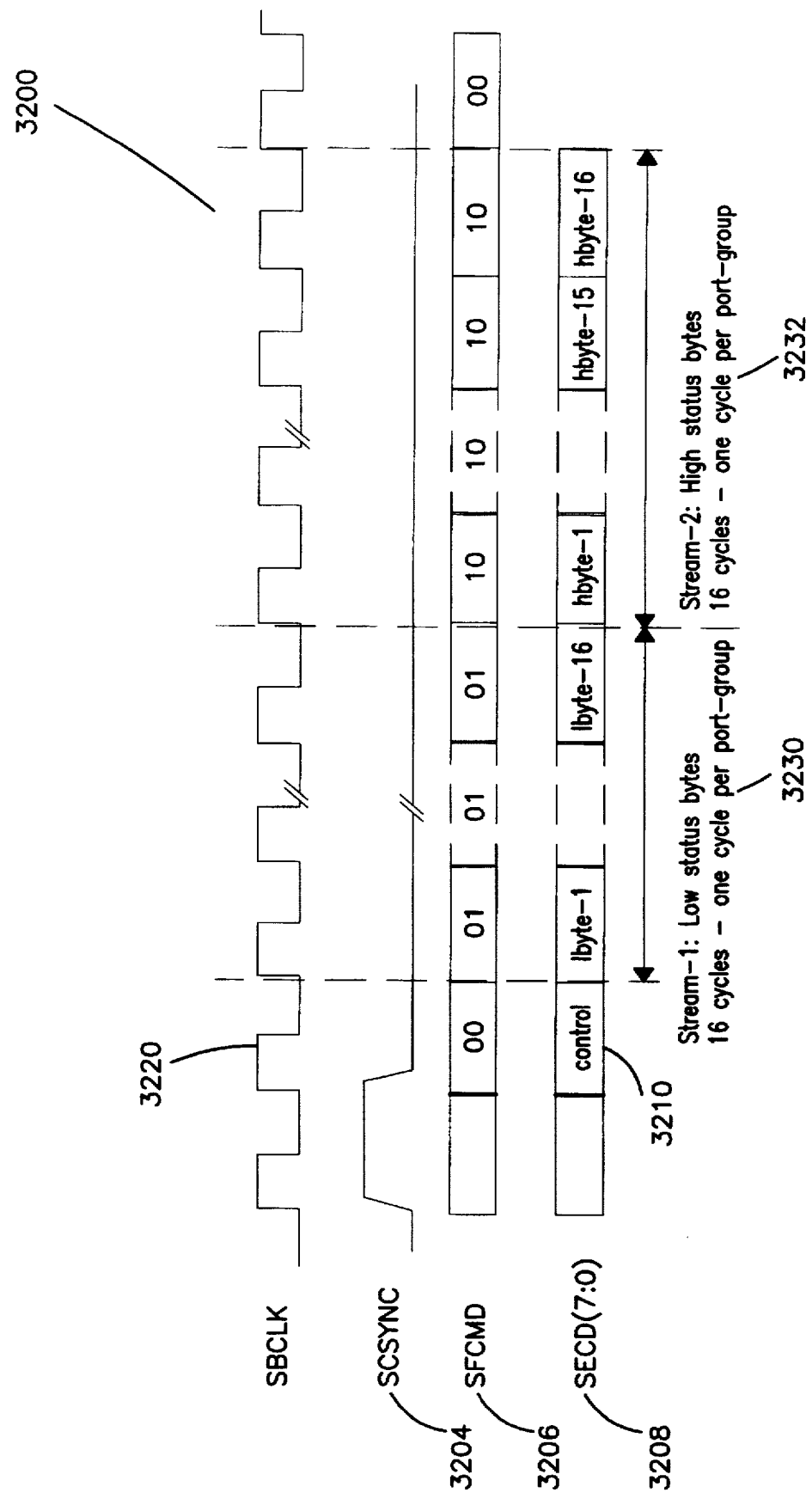
FIG. 32 illustrates the SC bus switch status report transaction cycle operation and the timing according to the present invention.

The frame control 3210 byte field in FIG. 32, contains one bit, STRVLD, to indicate a valid switch status report operation, five bit reserved and 2-bit Status report operation (SROP) fields indicates type of status reporting.

The status reporting operations and the corresponding SROP definitions are the following:

| SROP | Status Reporting Operation |
| --- | --- |
| 0 | No operation |
| 1 | Switch Fabric FIFO Status reporting |
| 2 | Reserved |
| 3 | ABR VCC Queue status reporting |

The HiPAS use the SROP field to assemble an appropriate SSTAT frame, which is transferred to the coupled switch port or port-group adapter. The status information is transparent to the HiPAS device and need not be processed. The port adapter which receives the SSTAT frame decode the format and process the status information. The STAT frame type can be a switch fabric FIFO status frame or an ABR VCC feed-back status frame.

Figure 33:
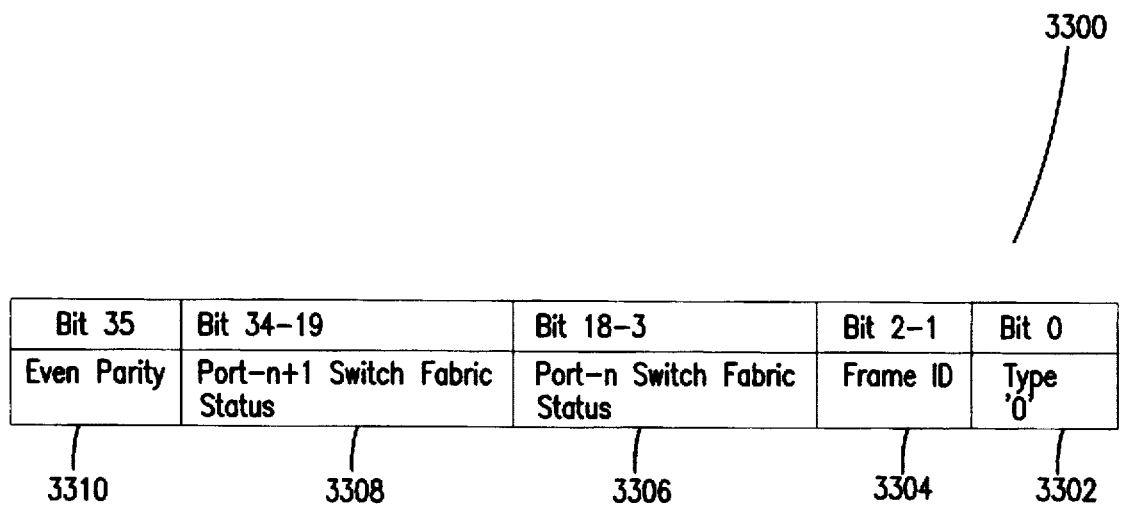
FIG. 33 illustrates the serial data frame format on the SSTAT serial port between the switch element and the switch port adapter according to the present invention.

The SSTAT frame format 3300 with reference to a typical 36 cycle cell transaction is shown in FIG. 33. The SSTAT frame carrying the switch fabric FIFO status information is indicated by '0' in the Type field 3302. In addition, the frame contains a 2-bit Frame ID 3304 field indicates the frame sequence and 16-bit fabric status 3306, 3308 for two ports. The following encoding may be used for the Frame ID 3304 indication:

| Frame ID | Description |
| --- | --- |
| 1 | Start of status frame. The frame starts with the status information for the port-0. |
| 2 | Middle of status frame. The port number continues sequentially from the previous frame. |

-continued

| Frame ID | Description |
| --- | --- |
| 3 | End of status frame. This is the last segment of the status frame and ends with the last port-15. |

Figure 34:
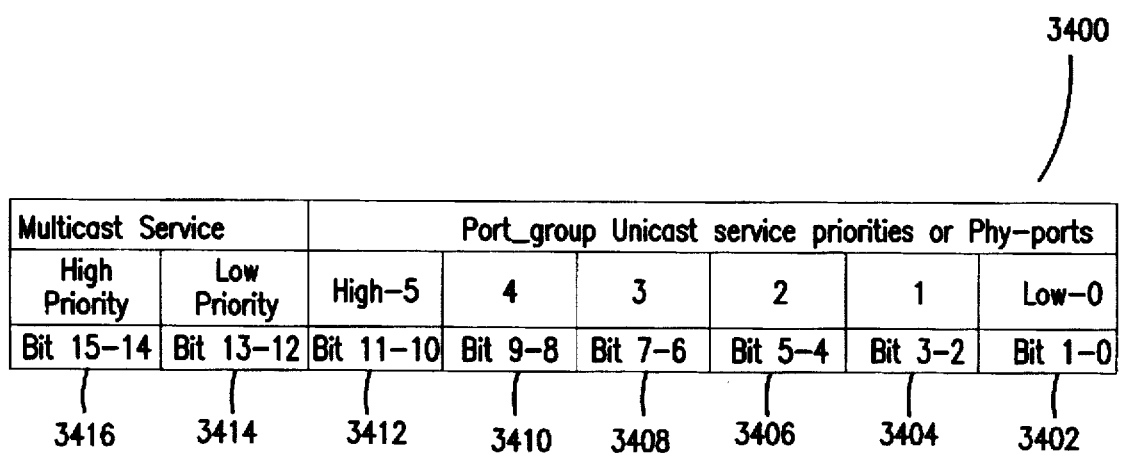
FIG. 34 illustrates Switch Fabric status information that uses a 16-bit field in the SSTAT frame according to the present invention.

The 16-bit switch fabric status word per switch-port 3304, 3306 provides a 2-bit status per service priority class. The port status format 3400 is shown in FIG. 34. The switch fabric controller, SCON supports 6 service priorities 3402 to 3412 (or 6 phy-port queues per port-group) and two priorities (low and high) 3414, 3416 for multicast service. The 2-bit status information per service class may use the following encoding:

| Status Code | Description |
| --- | --- |
| 0 | No status reported |
| 1 | FIFO Threshold-1 limit alarm |
| 2 | FIFO Threshold-2 limit alarm |
| 3 | FIFO Overflow |

Under the port-group service class mode, each service class queue status is provided and in the port-group phy-port queue mode, the status code represents the phy-port queue status.

Figure 35:
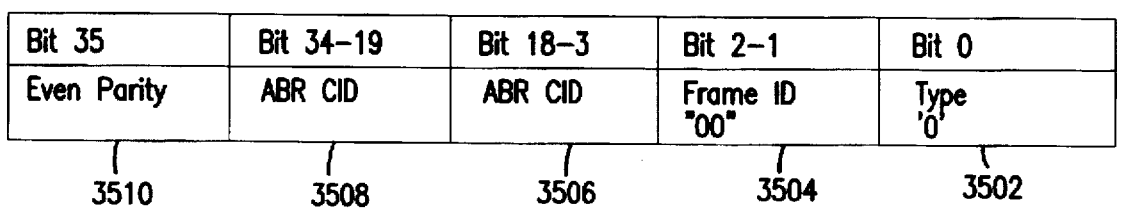
FIG. 35 illustrates ABR connection feed-back status frame format transferred through the SSTAT serial port between the switch element and the switch port adapter according to the present invention.

The SSTAT frame carrying the ABR VCC Feed-back status information 3500, shown in FIG. 35, is indicated with the Type field 3502 set to 0 and the Frame ID 3504 field set "00". In addition, each frame can hold up to two ABR connection identifiers 3506, 3508 (ABR CID) associated with a port-group. The SCON routes this SSTAT frame to the appropriate destination port-group based on the ABR connection feed-back status information received through the PSTAT frame.

The foregoing description of the exemplary embodiments of the invention has been presented for the purpose of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A scalable, shared memory switch, comprising:

at least one buffer memory device for storing cells;

at least one shared memory switch element, coupled to the at least one buffer memory device, the at least one shared memory switch element further comprising a cell bus, the shared memory switch element providing access to the at least one buffer memory device and performing input and output processing of cells received from the cell bus, the cell bus further comprising a parallel data path concatenable to provide a scalable bandwidth to the at least one shared memory switch element; and a fabric controller, coupled to the at least one shared memory switch element, for providing shared buffer management and control signals to the at least one shared memory switch element;

wherein the at least one buffer memory device is partitioned into memory segments and organized as interleaved memory, the interleaving being applied at a switch fabric port interface datapath, all the memory segments being accessed simultaneously.

2. The switch of claim 1 wherein the at least one shared memory switch element processes cell input simultaneously via control provided by the fabric controller.

3. The switch of claim 2 wherein the at least one switch element receives cell data from at least one switch port group coupled thereto.

4. The switch of claim 1 wherein the at least one switch element receives cell data from at least one switch port group coupled thereto.

5. The switch of claim 4 wherein the cell data from the a first port group is assembled independently from cell data from a second port group.

6. The switch of claim 5 wherein cell data is broken into cell data words and each cell data word is written into the at least one buffer memory device.

7. The switch of claim 1 wherein the at least one shared memory switch element reads a cell data word from the at least one buffer memory device.

8. The switch of claim 7 wherein the cell data word is disassembled and simultaneously transmitted to at least one switch port group coupled thereto.

9. The switch of claim 8 wherein the at least one shared memory switch element and the at least one switch port adapter device are coupled by the cell bus, the cell bus interleaving the data between the at least one switch element and the at least one port group.

10. The switch of claim 9 wherein the cell bus interleaves data between the at least one switch element and an N bit datapath forming a switch fabric port interface, N being a predetermined integer.

11. The switch of claim 10 wherein the cell bus interleaves the data between one switch element and one port group in a N-bit group.

12. The switch of claim 10 wherein the cell bus interleaves the data between two switch elements and two port groups in N/2-bit groups.

13. The switch of claim 10 wherein the cell bus interleaves the data between four switch elements and four port groups in N/4-bit groups.

14. The switch of claim 10 wherein the cell bus interleaves the data between eight switch elements and eight port groups in N/8-bit groups.

15. The switch of claim 10 wherein the cell bus interleaves the data between sixteen switch elements and sixteen port groups in N/16-bit groups.

16. The switch of claim 4 wherein the at least one switch element transmits cell data to at least one switch port group coupled thereto.

17. The switch of claim 16 wherein a shared memory switch element is assigned as a primary datapath controller for a port group, the cell transaction on the port group being controlled by the shared memory switch element assigned as the primary datapath controller for the port-group.

18. The switch of claim 16 wherein the switch port group multiplexes and demultiplexes cells from multiple ports to maximize bandwidth.

19. The switch of claim 16 wherein the switch port group further comprises a physical layer and an ATM protocol layer.

20. The switch of claim 19 wherein the physical layer implements a transport layer protocol, cell delineation functions and a physical media dependent interface.

21. The switch of claim 19 wherein the ATM protocol layer concentrates cell bandwidth and processes cells to determine appropriate routing information.

22. The switch of claim 21 wherein the ATM protocol layer further implements application dependent functions and protocol dependent functions.

23. The switch of claim 21 further comprising a switch fabric port interface, the switch fabric port interface comprising a receive interface port and a transmit interface port, cells being transferred to the switch fabric through the receive interface port and from the fabric to the switch ports through the transmit interface.

24. The switch of claim 23 wherein cells on the receive and transmit interface ports are transferred synchronously using a common switch fabric cell sync control from the switch fabric controller.

25. The switch of claim 23 wherein the switch fabric port interface provides status bit ports through which status information is exchanged between the at least one switch element and the at least one port adapter device.

26. The switch of claim 16 wherein the switch port group further comprises a physical layer and a packet protocol layer.

27. The switch of claim 26 wherein the physical layer implements transport layer protocol, cell delineation functions and physical media dependent interface.

28. The switch of claim 26 wherein the packet protocol layer concentrates packet bandwidth and processes packets to determine appropriate routing information.

29. The switch of claim 28 wherein the packet protocol layer further implements application dependent functions and protocol dependent functions.

30. The switch of claim 28 further comprising a switch fabric port interface, the switch fabric port interface comprising a receive interface port and a transmit interface port, packets being transferred to the switch fabric through the receive interface port and packets being transferred from the fabric to the switch ports through the transmit interface.

31. The switch of claim 30 wherein cells on the receive and transmit interface ports are transferred synchronously using a common switch fabric packet sync control from the switch fabric controller.

32. The switch of claim 1 wherein each memory segment is directly interfaced to a shared memory switch element.

33. A scalable, shared memory switch, comprising:

at least one buffer memory device for storing cells;

at least one shared memory switch element, coupled to the at least one buffer memory device, the at least one shared memory switch element further comprising a cell bus, the at least one shared memory switch element providing access to the at least one buffer memory device and performing input and output processing of cells received from the cell bus, the cell bus further comprising a parallel data path concatenable to provide a scalable bandwidth to the at least one shared memory switch element;

a fabric controller, coupled to the at least one shared memory switch element, for providing shared buffer management and control signals to the at least one shared memory switch element; and a microprocessor coupled to the fabric controller for providing control and processing thereto.

34. The switch of claim 33 wherein the at least one shared memory switch element is configured by the fabric controller during initialization under the control of the microprocessor.

35. A scalable, shared memory switch, comprising:

at least one buffer memory device for storing cells;

at least one shared memory switch element, coupled to the at least one buffer memory device, the at least one shared memory switch element further comprising a cell bus, the at least one shared memory switch element providing access to the at least one buffer memory device and performing input and output processing of cells received from the cell bus, the cell bus further comprising a parallel data path concatenable to provide a scalable bandwidth to the at least one shared memory switch element; and a fabric controller, coupled to the at least one shared memory switch element, for providing shared buffer management and control signals to the at least one shared memory switch element;

wherein the at least one shared memory switch element further comprises a high-speed multiport RAM, the high-speed multiport RAM receives and assembles data from a receive port interface and processes and transmits data to a transmit port interface.

36. The switch of claim 35 further comprising:

a staging buffer manager, coupled to the multi-port RAM, for managing buffer allocation and deallocation in the RAM using independent buffer pointer queues;

a shared memory access scheduler, coupled to the staging buffer manager, for receiving transaction status information, internal staging buffer status information and shared memory buffer control information respectively from a cell bus interface block, a staging buffer manager and a controller interface;

a shared memory interface unit, coupled to the shared memory access scheduler, for receiving shared memory access requests from the shared memory access scheduler, performing data transfers between external shared memory and the internal staging buffer memory, and implementing a RAM access protocol;

a common switch fabric controller bus interface unit, coupled to the shared memory access scheduler, for receiving switch configuration data;

a configuration and control register block, coupled to the common switch fabric controller bus interface unit, for storing switch configuration information; and a status port interface, coupled to the common switch fabric controller bus interface unit, for providing a path for exchanging status information between the switch element and a switch port adapter.

37. The switch of claim 35 wherein the receive port interface further comprises a receive data selector for selecting interleaved data segments from a receive datapath;

a plurality of receive barrel shifters, coupled to the receive data selector, a receive barrel shifter being associated with a port group, each receive barrel shifter providing a direct memory access channel and a data transfer path to the high-speed multi-port RAM;

a receive port direct memory access controller, coupled to the plurality of receive barrel shifters, for implementing a multi-channel DMA controller function;

a receive port staging RAM interface controller, coupled to the plurality of receive barrel shifters, for implementing a RAM interface protocol to complete the data transfer and sending data transfer acknowledgment to the receive port direct memory access controller; and a receive cell staging buffer, coupled to the receive port staging RAM interface controller, for storing assembled data words;

wherein the receive port direct memory access controller further provides control to select a receive barrel shifter to communicate with the receive port staging RAM interface controller, the receive port direct memory access controller providing address and control information to the receive port staging RAM interface controller, and a data transfer to the cell staging buffer being initiated when a data word is assembled.

38. The switch of claim 35 wherein the transmit port interface further comprises a transmit data demultiplexer including a cell bus datapath multiplexer and a cell bus protocol state machine, the transmit data demultiplexer assembling data elements into a bus data word;

a plurality of transmit barrel shifters, coupled to the transmit data demultiplexer, each transmit barrel shifter being associated with a port group and providing a direct memory access channel and data transfer path to the high-speed multi-port RAM;

a transmit port direct memory access controller, coupled to the plurality of transmit barrel shifters, for monitoring service requests from the barrel shifter and providing a multi-channel DMA controller function;

a transmit cell staging buffer, coupled to the transmit port direct memory access controller, for storing data words from the buffer memory device, the data words being disassembled on the transmit port; and a transmit port staging RAM interface controller, coupled to the plurality of barrel shifters, for implementing a RAM interface protocol to complete the data transfer and sending data transfer acknowledgment to the transmit port direct memory access controller;

wherein the transmit port direct memory access controller further provides control to select a transmit barrel shifter to communicate with the transmit port staging RAM interface controller, the transmit port direct memory access providing address and control information to transmit port staging RAM interface controller, and a data transfer from the cell staging buffer being initiated when a data word in the barrel shifter is disassembled.

39. A scalable, shared memory switch, comprising:

at least one buffer memory device for storing cells;

at least one shared memory switch element, coupled to the at least one buffer memory device, the at least one shared memory switch element further comprising a cell bus, the at least one shared memory switch element providing access to the at least one buffer memory device and performing input and output processing of cells received from the cell bus, the cell bus further comprising a parallel data path concatenable to provide a scalable bandwidth to the at least one shared memory switch element;

a fabric controller, coupled to the at least one shared memory switch element, for providing shared buffer management and control signals to the at least one shared memory switch element; and a switch fabric port interface, coupled to the at least one shared memory switch element, the switch fabric port interface comprising a receive interface port and a transmit interface port, cells being transferred to the switch fabric through the receive interface port and from the fabric to the switch ports through the transmit interface.

40. A scalable, shared memory switch, comprising:

at least one buffer memory device for storing cells;

at least one shared memory switch element, coupled to the at least one buffer memory device, the at least one shared memory switch element further comprising a cell bus, the at least one shared memory switch element providing access to the at least one buffer memory device and performing input and output processing of cells received from the cell bus, the cell bus further comprising a parallel data path concatenable to provide a scalable bandwidth to the at least one shared memory switch element;

a fabric controller, coupled to the at least one shared memory switch element, for providing shared buffer management and control signals to the at least one shared memory switch element; and a status port coupled between the switch fabric element for implementing a traffic management scheme for ABR traffic and for controlling ABR traffic in the switch.

41. A scalable, shared memory switch, comprising:

at least one switch port group for managing data segments received and transmitted via a cell bus;

at least one shared memory switch element, coupled to the at least one switch port group, the at least one shared memory switch element performing input and output processing of data segments, the at least one shared memory switch element further comprising a parallel datapath concatenable to provide a scalable bandwidth to the at least one shared memory switch element;

at least one buffer memory device, coupled to the at least one shared memory switch element, the at least one shared memory switch element providing access to the at least one buffer memory device, the at least one buffer memory device storing cells from the at least one shared memory switch element; and a fabric controller, coupled to the at least one shared memory switch element, for providing control signals to the at least one shared memory switch element;

wherein the at least one shared memory switch element receives and transmits cell data to and from the at least one switch port group, and wherein the at least one buffer memory device is partitioned into memory segments and organized as interleaved memory, the interleaving being applied at a switch fabric port interface datapath, all the memory segments being accessed simultaneously.

42. The switch of claim 41 wherein the at least one shared memory switch element processes cell input simultaneously via control provided by the fabric controller.

43. The switch of claim 41 wherein the cell data from a first port group is assembled independently from cell data from a second port group.

44. The switch of claim 43 wherein cell data is broken into cell data words and each cell data word is written into the at least one buffer memory device.

45. The switch of claim 41 wherein the at least one shared memory switch element reads a cell data word from the at least one buffer memory device.

46. The switch of claim 45 wherein the cell data word is disassembled and simultaneously transmitted to at least one switch port group coupled thereto.

47. The switch of claim 46 wherein the at least one shared memory switch element and the at least one switch port are coupled by a cell bus, the cell bus interleaving the data between the at least one switch element and the at least one port group.

48. The switch of claim 47 wherein the cell bus interleaves data between the at least one switch element and an N bit datapath forming a switch fabric port interface, N being a predetermined integer.

49. The switch of claim 48 wherein the cell bus interleaves the data between one switch element and one port group in a N-bit group.

50. The switch of claim 48 wherein the cell bus interleaves the data between two switch elements and two port groups in N/2-bit groups.

51. The switch of claim 48 wherein the cell bus interleaves the data between four switch elements and four port groups in N/4-bit groups.

52. The switch of claim 48 wherein the cell bus interleaves the data between eight switch elements and eight port groups in N/8-bit groups.

53. The switch of claim 48 wherein the cell bus interleaves the data between sixteen switch elements and sixteen port groups in N/16-bit groups.

54. The switch of claim 41 wherein a shared memory switch element is assigned as a primary datapath controller for a port group, the cell transaction on the port group being controlled by the shared memory switch element assigned as the primary datapath controller for the port-group.

55. The switch of claim 41 wherein the switch port adapter device multiplexes and demultiplexes cells from multiple ports to maximize bandwidth.

56. The switch of claim 41 wherein the switch port group further comprises a physical layer and an ATM protocol layer.

57. The switch of claim 56 wherein the physical layer implements a transport layer protocol, cell delineation functions and a physical media dependent interface.

58. The switch of claim 56 wherein the ATM protocol layer concentrates cell bandwidth and processes cells to determine appropriate routing information.

59. The switch of claim 58 wherein the ATM protocol layer further implements application dependent functions and protocol dependent functions.

60. The switch of claim 58 further comprising a switch fabric port interface, the switch fabric port interface comprising a receive interface port and a transmit interface port, cells being transferred to the switch fabric through the receive interface port and from the fabric to the switch ports through the transmit interface.

61. The switch of claim 60 wherein cells on the receive and transmit interface ports are transferred synchronously using a common switch fabric cell sync control from the switch fabric controller.

62. The switch of claim 60 wherein the switch fabric port interface provides status bit ports through which status information is exchanged between the at least one switch element and the at least one port group.

63. The switch of claim 41 wherein each memory segment is directly interfaced to a shared memory switch element.

64. The switch of claim 41 further comprising a microprocessor coupled to the fabric controller for providing control and processing thereto.

65. The switch of claim 64 wherein the at least one shared memory switch element is configured by the fabric controller during initialization under the control of the microprocessor.

66. The switch of claim 41 wherein the at least one shared memory switch element further comprises a high-speed multiport RAM, the high-speed multiport RAM receives and assembles data from a receive port interface and processes and transmits data to a transmit port interface.

67. The switch of claim 66 further comprising:

a staging buffer manager, coupled to the multi-port RAM, for managing buffer allocation and deallocation in the RAM using independent buffer pointer queues;

a shared memory access scheduler, coupled to the staging buffer manager, for receiving transaction status information, internal staging buffer status information and shared memory buffer control information respectively from cell bus interface block, a staging buffer manager and a controller interface;

a shared memory interface unit, coupled to the shared memory access scheduler, for receiving shared memory access requests from the shared memory access scheduler, performing data transfers between external shared memory and the internal staging buffer memory, and implementing a RAM access protocol;

a common switch fabric controller bus interface unit, coupled to the shared memory access scheduler, for receiving switch configuration data;

a configuration and control register block, coupled to the common switch fabric controller bus interface unit, for storing switch configuration information; and a status port interface, coupled to the common switch fabric controller bus interface unit, for providing a path for exchanging status information between the switch element and a switch port adapter.

68. The switch of claim 67 wherein the staging buffer manager further comprises independent staging buffer queue RAM and staging buffer queue pointer RAMs, where free staging buffer queues and staging buffer ready queues are maintained for the receive and transmit ports, and wherein the shared memory access scheduler operates in synchronization with a common switch fabric sync signal, collects the cell scheduling information, cell bus status information and routing information from the receive port interface unit and transmit port interface unit, staging buffer queue information from the staging buffer manager and shared memory buffer control information from the switch fabric controller bus interface unit and the shared memory access scheduler performs the data transfer scheduling function between the shared memory and the staging buffer RAM.

69. The switch of claim 68 wherein the shared memory interface unit implements the memory access protocol to access the shared memory coupled to the shared memory switch element.

70. The switch of claim 69 wherein the common switch fabric controller bus interface unit implements controller bus operations in synchronization with the common switch fabric sync signal and the controller bus operations consisting of the switch element configuration, which provides the access to the configuration and control register block in the switch element, receive cell buffer pointer write to provide the allocated free receive buffers in the shared memory, where the received cells are transferred, the transmit cell buffer pointer write to provide the switched output cell buffers from which the data to be transferred, receive cell switching control information transfer to transfer the routing information of the received cell or packet to the common switch fabric controller, which completes the switching function and the switch status report to collect the switch status information from the switch fabric controller, which consolidates the status information for all of the ports and traffic priorities.

71. The switch of claim 67 wherein the status port interface further comprises a switch port adapter status collection unit for receiving a port adapter buffer and ABR status information serial frame and a switch fabric status transfer unit for transferring a serial status frame to the port adapter, the status frame containing switch fabric status and ABR status information provided by the switch fabric controller bus interface unit.

72. The switch of claim 66 wherein the receive port interface further comprises a receive data selector for selecting interleaved data segments from a receive datapath;

a plurality of receive barrel shifters, coupled to the receive data selector, a receive barrel shifter being associated with a port group, each receive barrel shifter providing a direct memory access channel and a data transfer path to the high-speed multi-port RAM;

a receive port direct memory access controller, coupled to the plurality of receive barrel shifters, for implementing a multi-channel DMA controller function;

a receive port staging RAM interface controller, coupled to the plurality of receive barrel shifters, for implementing a RAM interface protocol to complete the data transfer and sending data transfer acknowledgment to the receive port direct memory access controller; and a receive cell staging buffer, coupled to the receive port staging RAM interface controller, for storing assembled data words;

wherein the receive port direct memory access controller further provides control to select a receive barrel shifter to communicate with the receive port staging RAM interface controller, the receive port direct memory access controller providing address and control information to the receive port staging RAM interface controller, and a data transfer to the cell staging buffer being initiated when a data word is assembled.

73. The switch of claim 66 wherein the transmit port interface further comprises a transmit data demultiplexer including a cell bus datapath multiplexer and a cell bus protocol state machine, the transmit data demultiplexer assembling data elements into a bus data word;

a plurality of transmit barrel shifters, coupled to the transmit data demultiplexer, each transmit barrel shifter being associated with a port group and providing a direct memory access channel and data transfer path to the high-speed multi-port RAM;

a transmit port direct memory access controller, coupled to the plurality of transmit barrel shifters, for monitoring service requests from the barrel shifter and providing a multi-channel DMA controller function;

a transmit cell staging buffer, coupled to the transmit port direct memory access controller, for storing data words from the buffer memory device, the data words being disassembled on the transmit port; and a transmit port staging RAM interface controller, coupled to the plurality of barrel shifters, for implementing a RAM interface protocol to complete the data transfer and sending data transfer acknowledgment to the transmit port direct memory access controller;

wherein the transmit port direct memory access controller further provides control to select a transmit barrel shifter to communicate with the transmit port staging RAM interface controller, the transmit port direct memory access providing address and control information to transmit port staging RAM interface controller, and a data transfer from the cell staging buffer being initiated when a data word in the barrel shifter is disassembled.

74. The switch of claim 41 wherein the switch port further comprises a physical layer and a packet protocol layer.

75. The switch of claim 74 wherein the physical layer implements a transport layer protocol, cell delineation functions and a physical media dependent interface.

76. The switch of claim 74 wherein the packet protocol layer concentrates packet bandwidth and processes packets to determine appropriate routing information.

77. The switch of claim 76 wherein the packet protocol layer further implements application dependent functions and protocol dependent functions.

78. The switch of claim 76 further comprising a switch fabric port interface, the switch fabric port interface comprising a receive interface port and a transmit interface port, cells being transferred to the switch fabric through the receive interface port and from the fabric to the switch ports through the transmit interface.

79. The switch of claim 76 wherein cells on the receive and transmit interface ports are transferred synchronously using a common switch fabric packet sync control from the switch fabric controller.

80. The switch of claim 41 further comprising a switch fabric port interface, the switch fabric port interface comprising a receive interface port and a transmit interface port, cells being transferred to the switch fabric through the receive interface port and from the fabric to the switch ports through the transmit interface.

81. The switch of claim 41 further comprising a status port coupled between the switch fabric element for implementing a traffic management scheme for ABR traffic and for controlling ABR traffic in the switch.

* * * * *